(12) United States Patent
Mendlovic et al.

(10) Patent No.: US 6,879,427 B2
(45) Date of Patent: Apr. 12, 2005

(54) SHEAR INDUCING BEAMSPLITTER FOR INTERFEROMETRIC IMAGE PROCESSING

(75) Inventors: David Mendlovic, Petach-Tikva (IL); Boris Glushko, Ashdod (IL); Efraim Goldenberg, Ashdod (IL); Gal Shabtay, Petach-Tikva (IL); Javier Garcia, Valencia (ES); Leonard Bergstein, Teaneck, NJ (US); Shlomo Eisenbach, Kfar-Pines (IL); Yehuda Miron, Tel-Aviv (IL); Aviram Sariel, Ramot-Hashavim (IL)

(73) Assignee: Lenslet Ltd., Herzelia-Pituach (IL)

( * ) Notice: Subject to any disclaimer, the term of this patent is extended or adjusted under 35 U.S.C. 154(b) by 0 days.

(21) Appl. No.: 10/257,425

(22) PCT Filed: Apr. 10, 2001

(86) PCT No.: PCT/IL01/00334

§ 371 (c)(1),
(2), (4) Date: Feb. 24, 2003

(87) PCT Pub. No.: WO01/78012

PCT Pub. Date: Oct. 18, 2001

(65) Prior Publication Data

US 2003/0169505 A1 Sep. 11, 2003

(30) Foreign Application Priority Data

Apr. 10, 2000 (IL) ................................. 135576
Jan. 23, 2001 (IL) ................................. 141041
Mar. 7, 2001 (IL) ................................. 141856

(51) Int. Cl.[7] .............................. G02F 1/01; G01B 9/02
(52) U.S. Cl. ...................................... 359/279; 356/520
(58) Field of Search ................................. 359/276–279; 356/520; 358/451–456

(56) References Cited

U.S. PATENT DOCUMENTS

| 3,969,699 A | 7/1976 | McGlaughlin ............... 382/281 |
| 4,005,385 A | 1/1977 | Joynson et al. ............. 382/199 |
| 4,016,413 A | 4/1977 | Bramley ..................... 382/280 |

(Continued)

FOREIGN PATENT DOCUMENTS

| DE | 36 16 393 | 7/1987 |
| DE | 42 03 855 | 8/1993 |
| EP | 0 341 385 | 11/1989 |

(Continued)

OTHER PUBLICATIONS

Akiba, A. et al.; "Fundamental Study on a Microoptic Image Preprocessor Composed of Planar Microlens Array;" Aug. 1991; Journal: Optics; vol. 20; No. 8; pp. 507–513.

Armand, A. et al.; "Real–Time Parallel Optical Analog–to–Digital Conversion;" Mar. 1980; Optics Letters; vol. 5; No. 3; pp. 129–131.

(Continued)

Primary Examiner—Georgia Epps
Assistant Examiner—Jessica Stultz
(74) Attorney, Agent, or Firm—Fenster & Company

(57) ABSTRACT

A shearing generator comprising: an input light source; an image generator that generates two images of the input light source at an output plane, the image generator comprising a beam splitter that splits light from the input source into at least one pair of interfering light waves at an output thereof, and defines different optical paths for the light propagation of the light waves, said optical paths including at least one phase shifting element that provides for a different phase shift for the two paths.

20 Claims, 13 Drawing Sheets

U.S. PATENT DOCUMENTS

| | | | |
|---|---|---|---|
| 4,124,278 A | 11/1978 | Grinberg et al. | 349/17 |
| 4,354,247 A | 10/1982 | Yao | 708/191 |
| 4,460,969 A | 7/1984 | Chen et al. | 708/410 |
| 4,575,248 A | 3/1986 | Horwitz et al. | 356/520 |
| 4,590,608 A | 5/1986 | Chen et al. | 302/281 |
| 4,597,630 A | 7/1986 | Brandstetter et al. | 359/9 |
| 4,603,398 A | 7/1986 | Bocker et al. | 708/839 |
| 4,607,344 A | 8/1986 | Athale et al. | 708/835 |
| 4,615,619 A | 10/1986 | Fateley | 356/310 |
| 4,697,247 A | 9/1987 | Grinberg et al. | 708/191 |
| 4,847,796 A | 7/1989 | Aleksoff et al. | 708/3 |
| 4,892,370 A | 1/1990 | Lee | 359/29 |
| 4,892,408 A | 1/1990 | Pernick et al. | 356/400 |
| 4,896,952 A | 1/1990 | Rosenbluth | 359/638 |
| 4,972,498 A | 11/1990 | Leib | 382/211 |
| 4,986,640 A | 1/1991 | Athale | 359/107 |
| 5,005,954 A | 4/1991 | Liu | 359/107 |
| 5,072,314 A | 12/1991 | Cheng | 359/559 |
| 5,080,464 A | 1/1992 | Toyoda | 359/559 |
| 5,099,448 A | 3/1992 | Myers et al. | 708/835 |
| 5,107,351 A | 4/1992 | Leib et al. | 359/11 |
| 5,138,489 A * | 8/1992 | Paek | 359/561 |
| 5,191,392 A | 3/1993 | Johnson | 356/491 |
| 5,216,529 A | 6/1993 | Paek et al. | 359/29 |
| 5,227,886 A | 7/1993 | Efron et al. | 348/62 |
| 5,235,439 A | 8/1993 | Stoll | 359/7 |
| 5,262,979 A | 11/1993 | Chao | 365/49 |
| 5,274,716 A | 12/1993 | Mitsuoka et al. | 382/210 |
| 5,297,068 A | 3/1994 | Guilfoyle et al. | 708/191 |
| 5,321,639 A | 6/1994 | Krishnamoorthy et al. | 708/7 |
| 5,327,286 A | 7/1994 | Sampsell et al. | 359/561 |
| 5,333,117 A | 7/1994 | Ha et al. | 708/191 |
| 5,339,305 A | 8/1994 | Curtis et al. | 369/103 |
| 5,454,047 A | 9/1995 | Chang et al. | 382/280 |
| 5,537,492 A | 7/1996 | Nakajima et al. | 382/232 |
| 5,675,670 A | 10/1997 | Koide | 382/281 |
| 5,784,309 A | 7/1998 | Budil | 708/835 |
| 5,790,686 A | 8/1998 | Koc et al. | 382/107 |
| 5,822,323 A | 10/1998 | Kaneko et al. | 370/480 |
| 6,005,840 A | 12/1999 | Awater et al. | 370/206 |
| 6,008,943 A * | 12/1999 | Metelitsa | 359/618 |
| 6,058,121 A | 5/2000 | Kim et al. | 370/480 |
| 6,452,146 B1 * | 9/2002 | Barchers | 250/201.9 |
| 6,639,683 B1 * | 10/2003 | Tumbar et al. | 356/521 |
| 6,683,679 B2 * | 1/2004 | Belenkii | 356/28.5 |

FOREIGN PATENT DOCUMENTS

| | | |
|---|---|---|
| EP | 0 475 372 | 3/1992 |
| EP | 0 577 258 | 1/1994 |
| EP | 0 691 717 | 1/1996 |
| EP | 0 844 707 | 5/1998 |
| JP | 57-10123 | 1/1982 |
| JP | 5-333398 | 12/1993 |
| WO | WO 00/72104 | 11/2000 |
| WO | WO 00/72105 | 11/2000 |
| WO | WO 00/72267 | 11/2000 |

OTHER PUBLICATIONS

Brenner, K. H. et al.; "Implementation of an Optical Crossbar Network Based on Directional Switches;" May 10, 1992; Applied Optics; vol. 31; No. 14; pp. 2446–2451.

Cheng, L. M. et al.; "Optical Cosine Transform Using Phase Conjugation Technique;" Sep. 16–18, 1991; Proceedings of Third International Conference on Holographic Systems, Components and Applications; Organized by Electronics Division of the Institution of Electrical Engineers; pp. 113–117.

Cohn, R. W.; Link Analysis of a Deformable Mirror Device Based Optical Crossbar Switch; Jan. 1992; Optical Engineering; vol. 31; No. 1; pp. 134–140.

Eckert, W. et al.; "Compact Planar–Integrated Optical Correlator for Spatially Incoherent Signals;" Feb. 10, 2000; Applied Optics; vol. 39; No. 5; pp. 759–765.

Eckert, W. et al.; "Design and Fabrication of a Compact Planar–Integrated Optical Correlator;" Nov. 10–13, 1997; Conference Proceedings of the IEEE Lasers and Electro–Optics Society's $10^{th}$ Annual Meeting; LEOS '97; vol. 1; pp. 134–135.

Farr, K. B. et al.; "Lens Design for a White–Light Cosine–Transform Achromat;" Jan. 1, 1995; Applied Optics; vol. 34; No. 1; pp. 128–137.

Feitelson, D.; "Optical Computing;" Chapter "Optical Image and Signal Processing;" MIT Press 1988; pp. 102–104 and 117–129.

Fukui, M. et al.; "High–Throughput Optical Image Crossbar Switch that Uses a Point Light Source Array;" Mar. 1, 1993; Optics Letters; vol. 18; No. 5; pp. 376–378.

Fukui, M.; "Optoelectronic Parallel Computing System with Optical Image Crossbar Switch;" Nov. 10, 1993; Applied Optics; vol. 32; No. 32; pp. 6475–6481.

George, N. et al.; "Cosinusoidal Transforms in White Light;" Mar. 15, 1984; Applied Optics; vol. 23; No. 6; pp. 787–797.

Glaser, I.; "Noncoherent Parallel Optical Processor for Discrete Two–Dimensional Linear Transformations;" Oct. 1980; Optics Letters; vol. 5; No. 10; pp. 449–451.

Gonzalez, R. C. et al.; "Digital Image Processing;" 1992; Addison Wesley Publishing Company; pp. 84–119, 142–145 and 374–381; ISBN 0–201–50803–6.

Goodman, J. W.; "Analog Optical Information Processing;" Introduction to Fourier Optics; Chapter 8; Mc Graw Hill–Hill Companies; Second Edition; Copyright 1996; pp. 217–224.

Goodman, J. W. et al.; "Fully Parallel, High–Speed Incoherent Optical Method for Performing Discrete Fourier Transforms;" Jan. 1978; Optics Letters; vol. 2; No. 1; pp. 1–3.

Gourlay, J. et al.; "Hadamard Transform Image Processing and Its Optical Implementation with Ferroelectric Liquid Crystal Spatial Light Modulators;" Jan./Feb. 1995; International Journal of Optoelectronics (Incl. Optical Computing & Processing); GB; Taylor & Francis; London; vol. 10; No. 1; pp. 51–58; XP000582638.

Goutin, P. et al.; "Some New Result in Hybrid Acousto–Optic Processing;" Oct. 1992; Proceedings of the IEEE Ultrasonics Symposium; vol. 1; pp. 493–496.

Hamanaka, K. et al.; "Multiple Imaging and Multiple Fourier Transformation Using Planar Microlens Arrays;" Oct. 1, 1990; Applied Optics; vol. 29; No. 28; pp. 4064–4070.

Hamanaka, K. et al.; "Parallel Processing Using Microlens Arrays;" Tsukuba Research Laboratory; Nippon sheet Glass Co. Ltd.; pp. 59–64.

Hariharan, P.; "Shearing Interferometers;" Year 1985; Chapter 8: "Optical Wavefronts;" Optical Interferometry; pp. 134–138.

Hariharan, P.; "Shearing Interferometers;" Year 1992; Chapter 9: "Optical Testing;" Basics of Interferometry; pp. 86, 87, 90, 99, 194 and 195.

Harmuth, H. F.; "Sequency Theory—Foundations and Applications;" 1977; Academic Press; pp. 1–121.

Huang, H. X. et al.; "Fast Parallel Complex Discrete Fourier Transforms Using a Multichannel Optical Correlator;" Nov. 15, 1998; Optics Communications; vol. 68; No. 6; pp. 408–411; Amsterdam; The Netherlands; XP000006236.

Ikuro, K. et al.; JP 02–127625; May 16, 1990 & Patent Abstracts of Japan; Jul. 30, 1990; vol. 14; No. 352 (P–1085).

Inbar, H. et al.; "Modified Joint Transform Correlator Binarized by Error Diffusion Spatially Variant Range Limit;" Jul. 10, 1994; Applied Optics; Optical Society of America; Washington; vol. 33; No. 20; pp. 4444–4451; XP000455183.

Juvells, I. et al.; "Optical Pattern Recognition in Motion Acquired Scenes Using a Binary Joint Transform Correlation;" Feb. 1997; Journal of Modern Optics; vol. 44; No. 2; pp. 313–325; XP000912224.

Kirk, A. G. et al.; "Experimental Implementation of an Optoelectronic Matrix–Matrix Multiplier which Incorporates Holographic Multiple Imaging;" Dec. 1992; Optical Computing and Processing; vol. 2; No. 4; pp. 293–304; XP361747.

Koc, U. et al.; "DCT–Based Motion Estimation;" Jul. 1998; IEEE Transactions on Image Processing; vol. 7; No. 7; pp. 948–965.

Koc, U.; "Low Complexity and High Throughput Fully DCT–Based Motion Compensated Video Coders;" presented in 1996 to Ray Liu, K. J. of the Institute for Systems Research; University of Maryland; Harvard University and Industry.

Lee, J. N.; "Acoutsto–Optic Techniques for Information Processing Systems;" Oct. 14–16, 1987; IEEE Ultrasonics Symposium; vol. 1; pp. 475–484.

Marom, D.M. et al.; "All–Optical Reduced State 4×4 switch;" Mar. 1996; Optics and Photonics News; p. 43; col. 3.

Marom, D. M. et al.; "Compact All–Optical Bypass–Exchange Switch;" Jan. 10, 1996; Applied Optics; vol. 35; No. 2; pp. 248–253.

Mendlovic, D. et al.; "Joint Tranform Correlator With Incoherent Output;" Dec. 1994; JOSA; vol. 11, No. 12; pp. 3201–3205.

Nomura, K. et al.; "Hartley Transformation for Hybrid Pattern Matching;" Oct. 10, 1990; Applied Optics; vol. 29; No. 29; pp. 4345–4350.

Psaltis, D. et al.; "High Accuracy Computation with Linear Analog Optical Systems; A Critical Study;" Sep. 15, 1986; Applied Optics; vol. 25; No. 18; pp. 3071–3077.

Rao, K. R. et al.; "Decimation–in–Time (DIT) and Decimation–in–Frequency (DIF) Algorithms;" 1990; DCT–Algorithms, Advantages Applications; Chapter 4.4; Academic Press Inc.; pp. 56–61.

Stone, T. W. et al.; "Optical Array Generation and Interconnection Using Birefringent Slabs;" Jan. 10, 1994; Applied Optics; vol. 33; No. 2; pp. 182–191.

Tomoshi, M. et al.; JP 2–120917; May 8, 1990 & Patent Abtracts of Japan; Jul. 25, 1990; vol. 14; No. 304 (P–1082).

Wang, N. et al.; "Cantor Network, Control Algorithm, Two–Dimensional Compact Structure and Its Optical Implementation;" Dec. 10, 1995; Applied Optics; vol. 34; No. 35; pp. 8176–8182.

Wong, K. W. et al.; "Optical Cosine Transform Using Microlens Array and Phase–Conjugate Mirror;" May 1992; Japanese Journal Applied Physics; vol. 31; pp. 1672–1676; XP000323136.

Wu, A.; "A Fast Algorithm for Reduced–Complexity Programmable DSP Implementation of the IFFT/FFT in DMT Systems;" Nov. 8–12, 1998; Globecom '98; The Bridge to Global Integration; vol. 2; pp. 833–838; XP000825870.

Wu, Y. et al.; "Optical Crossbar Elements Used for Switching Networks;" Jan. 10, 1994; Applied Optics; vol. 33; No. 2; pp. 175–178.

Wyant, J. C.; "OTF Measurements With a White Light Source: an Interferometric Technique;" Jul. 1975; Applied Optics; vol. 14, No. 7; pp. 1613–1615.

Wyant, J. C.; "Use of an AC Heterodyne Lateral Shear Interferometer With Real–Time Wavefront Correction Systems;" Nov. 1975; Applied Optics; vol. 14, No. 11; pp. 2622–2626.

Yatagai, T.; "Optical Computing in Japan;" Oct. 1998; Future Generation Computer Systems; vol. 4; No. 3; pp. 177–187; XP000111373.

Yoshida, A. et al.; "Optical Computing Techniques for Image/Video Compression;" Proceedings of the IEEE; US; New York; vol. 82; No. 6; pp. 948–954; XP000438344.

Yu, F. T. S. et al.; Optical Signal Processing, Computing, and Neural Networks; 1992; John Wiley & Sons, Inc.; Sections 8.7 and 8.8; pp. 308–319 and 326–329.

"Performance of 4 × 4 Optical Crossbar Switch Utilizing Acousto–Optic Deflector;" Feb. 16, 1989; Electronics Letters; vol. 25; No. 4; pp. 252–253.

* cited by examiner

SHEAR INDUCING BEAMSPLITTER FOR INTERFEROMETRIC IMAGE PROCESSING

RELATED APPLICATIONS

The present application is a US national application of PCT Application No. PCT/IL01/00334, filed on Apr. 10, 2001.

FIELD OF THE INVENTION

This invention is generally in the field of signal transform techniques, and relates to an optical discrete transform method and system.

BACKGROUND OF THE INVENTION

Transform techniques have played an important role in signal processing for many years. The need for transform techniques is associated with the fact that the amount of generated data (an input signal) may be so great that it results in impractical storage, processing and communication requirements. In such cases, representations beyond the simple sampling and quantization are needed. In addition, many kinds of frequency domain processing are known. When the input data is not in the frequency domain, a transformation of the data is generally required to apply such processing.

Image compression addresses the problem of reducing the amount of data required to represent a digital image. Various communication techniques recently developed, such as Asymmetric Digital Subscriber Line (ADSL), deal with the transmission of a great amount of data to a subscriber premise. ADSL can substantially transform an existing public information network from one limited to voice, text and low resolution graphics, to a powerful, ubiquitous system capable to bringing multimedia (including full motion video) to every home.

In order to process an input signal (e.g., an image of an object scene) using conventional ADSL techniques, the input signal must first be received by a transducer and converted into an appropriate form. The choice of a particular transform in a given application depends on the amount of reconstruction error that can be tolerated and the computational resources available. Fourier transform is very popular because of its wide range of applications. Fourier transformations can be performed electronically using a suitable computer and software. For electronic processing, the input data presented in a time domain is converted into a frequency domain and vice versa, and for coherent optical processing the input data is converted into amplitude transmittance variations.

Processing by a computer is usually serial in nature and the processing speed is very limited. The use of an array processor increases the amount of parallelism, as well as the processing speed. True real time (speed of light) processing, however, is still not possible with this approach.

Coherent optical processors can perform the Fourier transformation in real time. However, spatially coherent illumination suffers from phenomenon such as a speckle effect, i.e., the appearance of bright dots (interference phenomena) in the output correlation plane. When dealing with pattern recognition, which is part of an image processing technique, this effect is generally undesirable, since speckle can cause a false alarm in identification of the object.

The use of incoherent light, avoids the speckle effect (reducing signal noise) and may increase the dynamic range of the resultant transform. Since optical processing is frequently performed over the intensity rather than the field amplitude, an incoherent system has a superior dynamic range over a coherent system. Incoherent light based systems are generally less sensitive to component deformation (e.g., flatness of a spatial light modulator), thus reducing the severity of component specifications, as compared to those of the coherent light based system.

Techniques aimed at performing the Fourier and related transforms utilizing spatially incoherent light have been developed. A shearing interferometer based technique appears to be an attractive technique of the kind specified. This technique is also useful for measuring wavefront parameters. The constructional and operational principles of the shearing interferometer are disclosed in the following publications:

(1) "*OTF Measurements With a White Light Source: an Interferometric Technique*", J. C. Wyant, Applied Optics 14, 1619 (1975);

(2) "*Use of an AC Heterodyne Lateral Shear Interferometer With Real-Time Wavefront Correction Systems*", J. C. Wyant, Applied Optics. 14, page 2622, (1975).

A joint transform correlator (JTC), based on the shearing interferometer, is disclosed in the following publication:

(3) "*Joint Transform Correlator With Incoherent Output*", D. Mendlovic et al., JOSA A11, 3201–3205 (1994).

Generally speaking, the shearing interferometer based technique deals with input objects that are (quasi-) monochromatic, but spatially incoherent. In general, this means that points in the input signal are (locally) temporally coherent but spatially incoherent (with the other points). Herein, such objects are termed "locally temporally coherent".

The principle of shearing interferometer based techniques can be thought of as the creation of an interference pattern in an output plane. This interference pattern can be formed by two light sources each corresponding to an input signal. For example, one of the sources may be a vector or an array of locally spatially coherent light sources. Each source is the inverse image (either real or virtual) of another source, and each position in each of the sources is coherent only with its image source. To this end, a common shearing interferometer optical setup is provided with two signals indicative of the object, wherein each of these two signals is obtained by imaging each position on the object (which is spatially coherent with itself), thus enabling the interference between these two signals.

FIGS. 1A and 1B illustrate known optical setups 1A and 1B of, respectively, a shearing interferometer and a spatially incoherent JTC utilizing the same. To facilitate understanding, the same reference numbers are used for identifying those components, which are common in the setups 1A and 1B.

The shearing interferometer setup 1A is composed of an incoherent light source assembly 2 composed of spatially continuous, spatially incoherent and locally temporally coherent light, a beam splitter 3, a regular mirror 4 that creates a virtual coherent image of each point source, and a corner prism 5. There are two optical paths: one with via regular mirror 4, and the other via corner prism 5. The path of the regular mirror 4 reflects the input spatially incoherent image as is, and the path with the corner prism 5 provides a reflected mirror image. Thus, the wavefronts emanating from both optical paths interfere. This interference can be detected in an output plane OP (located downstream of the beam splitter), where an output acquisition device, e.g., CCD, is placed (not shown). Interference based on sourceand mirror-images is known in the art, e.g., the Lloyd's mirror (Born & Wolf, Principles of optics, 1980, p. 262).

In the incoherent JTC setup 1B, the shearing interferometer of FIG. 1A is associated with a conventional coherent system 6 for performing a Fourier transform. The system 6 comprises a coherent light source 26 producing an input object, a lens 7, and an optional filter (not shown). Mounted in the optical path of light ensuing from the system 6 and propagating towards the shearing interferometer 1A, is a rotating diffuser 9.

Referring additionally to FIG. 1A, due to the light passage through the beam splitter 3, teach point on the input image is doubled. The fact that each point in the input image is temporally coherent only with one single point in its mirrored image provides a separate interference pattern due to each point of the image. Due to the wave nature of light, the free space propagation of two coherent points is an interference pattern with a frequency proportional to the distance between these points. All other parts of the image are fully incoherent with the two points, thus the intensity follows the cosine transform. This is described in the above publication (3).

The mathematical analysis in (3) shows that the amplitude impulse response of the system is as follows:

$$\delta(x-x_0) \rightarrow \cos(kx_0 v) \quad (1)$$

Here, $\delta$ is the delta functional; $x_0$ is the shifted center of the input signal (information to be transmitted); k is a constant associated with the geometry of the shearing interferometer, e.g., $k=2\pi/\lambda z$ corresponds to the coordinate of the output plane.

Since for an impulse at the input, the output is purely coherent, the output function is bipolar (includes positive and negative values). However, available detectors are sensitive to intensities, rather than fields. Thus, the intensity of the impulse response must be considered:

$$I(x-x_0) \rightarrow \cos^2(kx_0 v)=0.5(1+\cos(2kx_0 v)) \quad (2)$$

It should be noted that the sum of many incoherent signals obtained, for example, from many discrete point sources of the input object is represented by the sum of their intensities, rather than their fields.

The intensity also acts as a cosine transform, but with a certain bias. The mathematical analysis of the same are given in the above publication (3). Evidently, this optical setup needs no lens for performing the Cosine transform.

SUMMARY OF THE INVENTION

As indicated above, the prior art describes a method for producing cosine transforms of an object utilizing a spatially continuous light source. In general, sine transformations are desirable or needed to fully define an input image. Furthermore, many optical processing systems utilize a modulated light source producing input light from an array of light emitting elements, or a combination of a coherent light emitting element and a Spatial Light Modulator (SLM). The modulated light beam is processed by various optical elements, and the processed light is detected by a detector such as a CCD. Both the modulated light source and the detector, are discrete optical elements, while the nature of light processing based on the known transformation techniques is continuous. This introduces a mismatch between the input signal to be processed (i.e., modulated light) and the detected output signal.

An aspect of some embodiments of the invention, is concerned with the provision of sine transforms for extended optical light sources. In some embodiments of the invention both sine and cosine transforms are provided. In some embodiments of the invention, the source may be discrete or continuous.

In exemplary embodiments of the invention a shearing generator is used in the production of the transform. In some embodiments, two or more displaced and optionally inverted replicas of an extended input optical signal are produced by the shearing generator. The input signal modulated, locally temporally coherent and spatially incoherent. Each point in the replicas has a corresponding point in the other replica (which may be the input signal) with which it is temporally coherent. However, it is incoherent with all other points in the same and other replica. The replicas are capable of interfering with each other in an output plane. The so obtained interference pattern presents the transform of the input signal.

For some embodiments of the invention, the replicas have the same phase an output of the generator. These embodiments can be used to produce cosine transforms. In other embodiments, the phase difference between the replicas is $\pi/2$. These embodiments can be used to produce sine transforms. Other transforms, such as Fourier and Hartly transforms and two dimensional transforms can also be produced utilizing the apparatus and methods disclosed herein.

An aspect, of some embodiments of the invention, is concerned with the provision of transforms of discrete light sources.

Some embodiments of the invention obtain an output signal, indicative of the discrete transform (cosine and/or sine), of an input signal (which may be either continuous or discrete), in an output plane (where a detection means are placed), by means of an optical system. In an exemplary embodiment of the invention, the optical system is based on the principle of shearing interferometry, and has a predetermined geometry constrained by a matching condition between the input and output signals.

An aspect of some embodiments of the invention is concerned with the provision of input/output matching in shearing interferometers.

The inventors have found that one-dimensional and two-dimensional discrete transform (cosine or sine) can be obtained with a shearing interferometer configuration, provided it satisfies a matching condition. Furthermore, the inventors have developed new configurations of the shearing interferometer. Some of these designs are less complex and/or more compact as compared to that of the conventional shearing interferometer based systems.

The matching condition defines a predetermined distance between the corresponding points in the input and output signals (i.e., the center of a pixel of the input signal and the center of a corresponding pixel of the output signal). Such matching is termed herein position matching. Optionally, the size and or intensity/sensitivity of the sources/detectors may be varied to optimally match the source and detector. Such matching is described below and in PCT application PCT/IL00/00282, filed May 19, 2000 and published as WO 00/72105, the disclosure of which is incorporated by reference.

An aspect of some embodiments of the invention relates to optically generating a discrete transform of a complex input signal.

Some embodiments of the invention deal with one-dimensional objects, some with two-dimensional objects and some with both. In the case of a one-dimensional object, the optical system provides one pair of interfering signals, namely the original signal and one additional signal, as described above. In the case of a two-dimensional object, two mutually perpendicular pairs of the interfering signals are provided (either simultaneously or sequentially), the two signals of each pair interfering with each other.

The term "locally temporally coherent" as used herein signifies that each point in the input signal is only coherent with itself and incoherent with the other points. It should be understood that such coherence need not be perfect and that the invention is also applicable to quasi-monochromatic signals for which the wavelength variation during the difference in time of flight of two interfering signals is negligible in comparison with the mean wavelength of the radiation. This implies that generation of the interfering images can be obtained from a single point source and that dispersion effects can be neglected.

To provide the spatially modulated input signal, the light source may comprise one or more light emitting elements (e.g., a vector or an array of such elements or an expanded light source), and an SLM, for example, an acousto-optic modulator. Alternatively, the light source may comprise an array of vertical cavity surface emitting lasers (VCSELs), thereby eliminating the need for any additional SLM. Thus, the input signal is created either by spatially modulating the light source or by changing the output of each point-like light emitting element of the light source in accordance with the information to be transformed. Alternatively, acousto-optic modulators can be used as well to represent the input signal.

In order to obtain N-elements discrete input signal, light emitting elements of the light source assembly may be arranged in a one- or two-dimensional array, based on the required application.

To provide the at least one pair of interfering signals, splitting of the input signal may be required, and possibly also the appropriate rotation of the split-images, when needed. The splitting can be achieved by prisms or by locating a suitable splitting means, such as diffractive optical element(s), splitting the energy in the optical path of light emitted by the light source. Generally speaking such a splitting means creates two images of an original input, such that each of the created images has preferably half of the energy of the original input. When the emitting divergence angle of the light source is not sufficiently large to enable sufficient interference area in the output plane, the splitting means is of a kind providing diffraction angles higher than the divergence angle of the light source.

The splitting of the input signal can be achieved without any specific splitting means, by using the light source characterized by sufficiently wide divergence (e.g., suitable LEDs or VCSELs). In this case, the two signals are obtained by using a different part of the opening for each signal.

As for the rotation of the input signal or at least one of the split signals, in some embodiments of the invention, it is achieved as a by-product at the splitting stage, by using a mirror as the splitting means. In other words, when dealing with one pair of interfering signals (i.e., one-dimensional object), the input signal can be directed onto a mirror normally (with zero incident angle), thereby producing an inverted image of the input signal. The two interfering signals, i.e., the input signal and its inverted image, will produce an interference pattern in the output plane. When dealing with two pairs of interfering signals (i.e., two-dimensional objects), a right-angle mirror may be used producing three images of the input signal, thereby resulting in two pairs of interfering signals, such that the signals in one pair are parallel to each other, and the signals of different pairs are perpendicular to each other.

In another embodiments of the invention, the mirror is replaced by lens and/or prisms setups. The at least one pair of interfering signals produced by splitting the input signal propagates through the corresponding number of the lens and/or prisms setups, which create the output signal in the form of the interference pattern in the output plane.

In yet another embodiments of the invention, the optical setup is designed like a planar sheet containing a beam splitter and mirrors formed at some edges of the beam splitter.

According to yet another embodiments of the invention, the optical assembly is based on a cubic beam splitter and a phase-shifting means, so as to obtain simultaneously cosine and sine discrete transform of the input signal.

An aspect of some embodiments of the invention is concerned with the provision of practical two dimensional inputs for one dimensional shearing generators. Where large amounts of data are to be processed, it may be impractical to generate a single array of discrete points to produce the input signal required for the shearing generator. In exemplary embodiments of the invention, where N elements are required, the elements are divided into m pieces each having p elements, such that m*p=N; and the m pieces are configured to be offset in a direction perpendicular to a data axis of the shearing generator.

An aspect of some embodiments of the invention is concerned with the provision of shearing generators of novel design and/or performance characteristics.

In some embodiments of the invention the shearing generator splits the image at an input plane sending them down different paths to form two images at an output plane. These image are the same except for an optional rotation and for a possible phase shift. The phase shift may be zero. In some embodiments it is $\pi/2$. In some embodiments, the difference in phase is produced by providing a phase shifting element in one or both paths to introduce a differential phase shift between the images at the output plane. The phase shifting element can be a phase shifter placed in one of the paths. In other embodiments, the phase shifting element is part of a beam splitter that splits the input image.

In some embodiments of the invention, the generation of two images in a plane is produced without any reflective surfaces, except for a partial reflection at a beam splitter. The beams are guided to parallelism utilizing refractive surfaces of the beam splitter itself or utilizing a separate prism or prisms.

There is thus provided in accordance with an exemplary embodiment of the invention, optical apparatus for obtaining a discrete transform of an input signal in an output plane, the system comprising:

a light source positioned at an input surface, the source comprising an array of N spaced temporally coherent, spatially incoherent light elements representative of the signal, spaced with a first spacing;

a detector positioned at an output surface, the detector comprising an array of N spaced detectors, spaced with a second spacing, such that it N samples light at the output surface; and an optical transformer that collects light from the light source and transforms it into a pattern at the output surface, said optical transformer being constructed such, such that the N sampling of the output signal results in the discrete transform of the input signal, wherein said optical transformer includes a shearing generator that provides two images of the light source that are inverted forms of each other, interference between said images providing a continuous interference pattern that is sampled by said detector. Optionally, the shearing generator introduces a phase difference between corresponding points on said two images such that the transform is a sine transform. Alternatively or additionally, the shearing processor provides a phase difference between corresponding points on said two images such that the transform is a cosine transform.

There is also provided in accordance with an exemplary embodiment of the invention, optical apparatus for obtaining a sine transform of an input signal in an output plane, the system comprising:

a light source positioned at an input surface, said source being a temporally coherent, spatially incoherent light distribution representative of the signal;

a detector positioned at an output surface, that detects light at the output surface; and an optical transformer that collects light from the light source and sine transforms it into a pattern at the output surface, said output pattern representing a sine transform of the input signal, wherein said optical transformer includes a shearing generator that provides two images of the light source that are inverted forms of each other and have a phase shift between them, such that interference between said images provides a continuous interference pattern that is sampled by said detector. Optionally, the input source is a discrete source and the detector samples the output to provide a discrete sine transform of the input source.

In an exemplary embodiment of the invention, said optical apparatus provides both sine and cosine transforms or at least one combination of sine and cosine transforms.

In an exemplary embodiment of the invention, said transform is a two dimensional transform. Optionally, the optical assembly comprises anamorphic optics accommodated in the optical path of the two interfering signals, the system thereby providing for obtaining a two-dimensional transform of a two-dimensional input signal.

In an exemplary embodiment of the invention, the transform is a JPEG transform. Alternatively, the transform is a Fourier transform. Alternatively, the transform is a Hartly transform.

In an exemplary embodiment of the invention, the signal represents an image.

In an exemplary embodiment of the invention, the optical transformer is constructed and configured to match the input source and detector geometry, and said matching condition is at least partly determined by a distance between the input and output signals. Optionally, said matching condition comprises matching position of detector elements to the geometry of elements of the source. Alternatively or additionally, said matching condition comprises matching one or more of sensitivity, gains, intensity and sizes of elements of the source and detector and the optical geometry between the input and output.

In an exemplary embodiment of the invention, the light source includes a highly coherent or partially coherent light emitting element, and a spatial coherence removing element.

In an exemplary embodiment of the invention, the light source includes an array of temporally coherent, but mutually spatially incoherent light emitting elements. Optionally, said light source includes vertical cavity surface emitting lasers (VCSEL).

In an exemplary embodiment of the invention, the light source comprises a one-dimensional array of N light emitting elements, the total length of said array being not less than $N*a$, wherein a the pitch of the array.

Alternatively, the light source comprises a two-dimensional array of N light emitting elements.

Alternatively, the N light emitting elements are aligned along a shearing symmetry X-axis of the system, said two-dimensional array being formed by a plurality of m parallel portions extending along the X-axis and aligned in a spaced-apart relationship along a Y-axis, each of the portions containing n light emitting elements aligned in a spaced-apart relationship along the X-axis with a pitch a, the entire number N of the light emitting elements of the light source being $n*m$.

In an exemplary embodiment of the invention, the N light emitting elements are aligned along a shearing symmetry X-axis of the system, said two-dimensional array being formed by a plurality of m parallel sections, each extending along the X-axis and aligned in a spaced-apart relationship along a Y-axis, each of the sections containing n light emitting elements aligned in a spaced-apart, overlapping relationship along the X-axis, such that the each light emitting element in each section is separated by the distance a from a nearest light emitting element in another, locally adjacent section and separated by a distance $m*a$ from an adjacent element on the same section.

In an exemplary embodiment of the invention, the light source comprises a two dimensional rectangular array of N light emitting elements is arranged in an m×n matrix, wherein $N=m*n$, the m and n elements being aligned along the X- and Y-axes with pitches a and b, respectively, and said input signal is created by tilting the matrix by an angle $\beta$, satisfying the condition of $a*\cos\beta=n*b*\sin\beta$.

In an exemplary embodiment of the invention, the shearing generator comprises a splitting sub-assembly that splits light from the input source into at least one pair of interfering light waves, and defines different optical paths for the light propagation of the light waves. Optionally, said splitting sub-assembly comprises a diffractive optical element. Alternatively or additionally, said splitting sub-assembly comprises a beam splitter. Optionally, the beam splitter is a cubic beam splitter.

In an exemplary embodiment of the invention, the splitting sub-assembly comprises a mirror. Alternatively, said splitting sub-assembly comprises mirrors accommodated with respect to the light source assembly so as to provide three images of the input signal, the input signal and the three images forming two pairs of the interfering signals, the system to provide a two-dimensional transform of a two-dimensional input signal.

In an exemplary embodiment of the invention, the apparatus includes a phase shifting element formed by a coating on an inner diagonal surface of the beam splitter so as to provide a desired phase shift between the different parts of the input signal transmitted through and reflected from two parts of said surface at two opposite sides of a bisection line of the beam splitter, respectively.

In an exemplary embodiment of the invention, said splitting sub-assembly comprises a grating assembly splitting the input signal, the optical assembly further comprising a rotating sub-assembly in the optical path of the splitting sub-assembly for creating the two pairs of interfering signals.

In an exemplary embodiment of the invention, the optical assembly defines a substantially equal length of optical paths for the two images, thereby providing a cosine transform of the input signal in the output plane.

In an exemplary embodiment of the invention, the optical assembly comprises a phase shifting element in one of the two optical paths, so as to provide a $\pi/2$ phase difference in the length of optical paths for the two images, thereby providing a sine transform of the input signal in the output plane. Optionally, the phase shifting element comprises a coating on a reflecting or refractive surface of the splitting sub-assembly.

In an exemplary embodiment of the invention, the input light is a conjugate symmetric signal, the light source assembly comprising two separate arrays of light emitting elements for producing real and imaginary parts of the input signal.

In an exemplary embodiment of the invention, the input light is a conjugate symmetric signal, the light source assembly comprising two separate arrays of light emitting elements for producing real and imaginary parts of the input signal and wherein the optical transformer includes a cubic beam splitter accommodated with respect to the arrays of light emitting elements so as to transmit the real and imaginary parts of the input signal through an inner diagonal surface of the beam splitter from opposite sides of said surface.

In an exemplary embodiment of the invention, said optical assembly comprises at least one pair of separate setups for creating said at least one pair of interfering images in the form of, respectively, an inverted image and non-inverted image of the input signal. Optionally, the optical assembly has a planar structure, two optical paths defined by the two separate setups being placed beside each other.

There is also provided in accordance with an exemplary embodiment of the invention, a shearing generator comprising:
  an input light source;
  an image generator that generates two images of the input light source at an output, the image generator comprising a beam splitter that splits light from the input source into at least one pair of interfering light waves at an output thereof, and defines different optical paths for the light propagation of the light waves, said optical paths having a difference in length of $\pi/2$. Optionally, the optical paths including at least one phase shifting element that provides for a different phase shift for the two paths.

There is also provided in accordance with an exemplary embodiment of the invention, a shearing generator comprising:
  an input light source;
  an image generator that generates two images of the input light source at an output plane, the image generator comprising a beam splitter that splits light from the input source into at least one pair of interfering light waves at an output thereof, and defines different optical paths for the light propagation of the light waves, said optical paths including at least one phase shifting element that provides for a different phase shift for the two paths.

Optionally, the phase shifting element comprises a coating at said beam splitter. Alternatively or additionally, the phase shifting element comprises a phase shifting element in one of the paths. Optionally, the phase shifting element is a coating on an external surface of an optical block containing the beam splitter.

In an exemplary embodiment of the invention, the light waves form coplanar images at said output, said waves propagating normally to said output, the images being provided without reflection except from said beam splitter.

There is also provided in accordance with an exemplary embodiment of the invention, a mirror-less shearing generator comprising:
  an input source;
  an image generator that generates two images of the input light source at an output plane, the image generator comprising a beam splitter that splits light from the input source into at least one pair of interfering light waves at an output thereof, and defines different optical paths for the light propagation of the light waves, neither of said optical paths including a reflecting surface, except for said beam splitter.

In an exemplary embodiment of the invention, the beam splitter provides two non-parallel waves and including at least one refractive element that refracts at least one of the waves, so that the waves are parallel. Optionally, the refractive elements are separate from the beam splitter. Alternatively, the refractive elements are interfaces at outer walls of the beam splitter.

There is also provided in accordance with an exemplary embodiment of the invention, a method of constructing an discrete input having N elements, for a one dimensional shearing generator having a data axis, the method comprising:
  providing m sections each having p elements, such that m*p=N; and
  configuring said m pieces offset in a direction perpendicular to the data axis. Optionally, the elements in each section are separated in the data direction by a distance $\alpha$, adjoining sections being offset in the data direction such that a first element of one section is offset by a distance $\alpha$ from a last element of an adjoining section, such that the N elements are spaced by $\alpha$ in the data direction. Alternatively, the elements in each section are separated by a distance $m*\alpha$ in the data direction, adjoining sections being offset in the data direction such that a first element of one section is offset by a distance $\alpha$ from a last element of an adjoining section, such the N elements are spaced by $\alpha$ in the data direction. Alternatively, the elements in the sections form a rectangular matrix of evenly spaced elements and wherein the elements are spaced with respect to a first axis of the matrix by a spacing $\alpha/\cos\beta$ and rotating the rectangular matrix with respect to the data axis such that the first matrix axis makes an angle of $\beta$ with the data axis.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF SOME EMBODIMENTS OF THE INVENTION

Figure 1A:
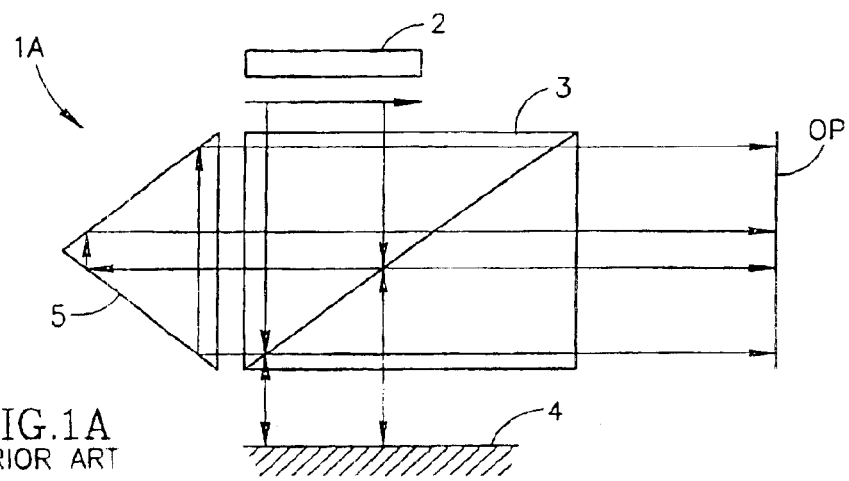
FIGS. 1A and 1B are prior art shearing-interferometer-based systems.
Figure 1B:
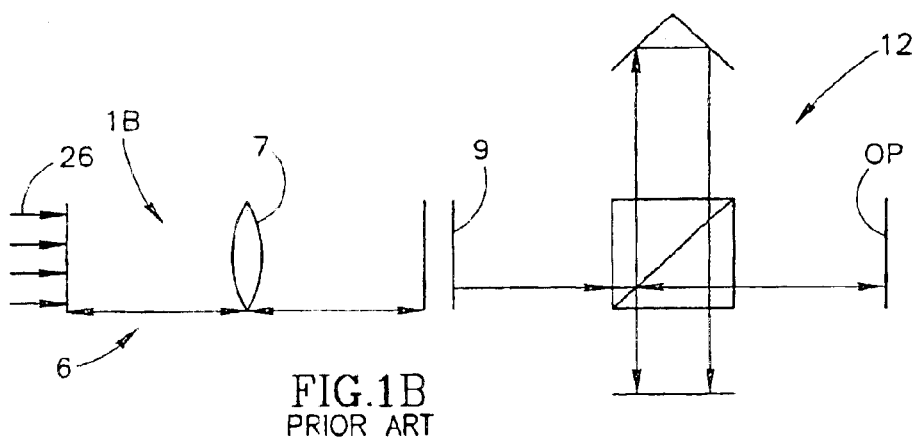

FIGS. 1A and 1B illustrate the conventional configurations of the shearing interferometer based systems that are known as capable of performing the Cosine transform of an input signal.

As indicated above, for most practical cases of signal processing, a discrete format of transformation is needed. It will be shown in the description below that a discrete cosine and sine transforms can be obtained with configurations similar to or, in some cases the same as the conventional shearing interferometer configurations.

Figure 2:
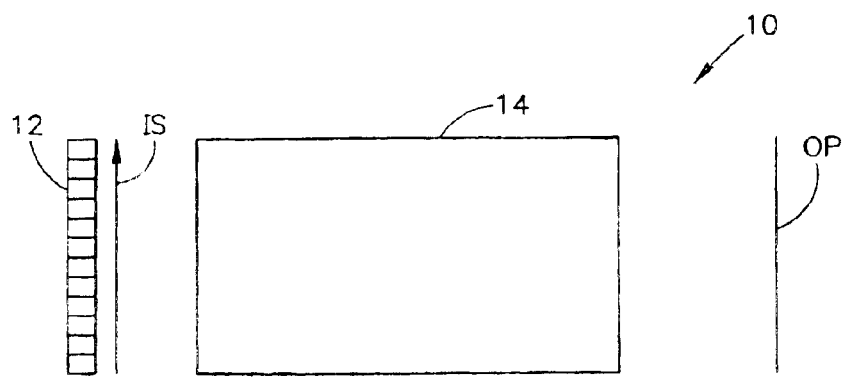
FIG. 2 is a schematic block diagram of an optical system according to an embodiment of the invention.

Reference is made to FIG. 2 illustrating a schematic block diagram of an optical system 10 according to the invention.

The system 10 comprises a light source 12 that produces a spatially modulated spatially incoherent locally temporally coherent input signal IS (corresponding to an input object or other image, such a computer generated image, which is not specifically shown, or a non-image signal), which is to be transformed in an output plane OP, and an optical assembly 14 that produces at least one pair of interfering signals producing an interference pattern in output plane OP.

In the output plane, although not specifically shown, a detector array is generally placed. The manner in which, among other things, this array should be placed and detectors be configured with finite size sources is defined by the matching condition described below.

As indicated above, the light source 12 is locally temporally coherent (and, as defined above, spatially incoherent). Such a light source may include a highly coherent light emitting element (e.g., diode laser) or a partially coherent light emitting element (such as LED), and a suitable coherence breaking means (e.g., diffuser). Alternatively, an array of coherent light emitting elements such as vertical cavity surface emitting lasers (VCSEL) can be used. The main features to be considered when choosing a light source, as well as the advantages of using VCSELs, will be described more specifically below.

The optical assembly 14 operates like a shearing interferometer, namely, provides a pair of images of the input signal IS, and defines the optical length for their propagation to the output plane OP, so as to enable interference between these images.

Consider the input signal transformation to be carried out by optical assembly 14 for obtaining an output signal in the form of a discrete cosine transform (DCT) in the output plane. It should be noted that, in the following disclosure, various mathematical versions of the DCT were used to derive the equations in each of the specific cases. Each of the aforesaid equations, which were derived using a specific version, can be derived using the other versions in a similar way.

For a given input signal f(x), the shearing interferometer provides the following output:

$$F(v) = \int_0^D f(x)\left[\frac{1}{2} *(1 + \cos(2kxv))\right]dx \tag{3}$$

wherein D is the dimension of the input signal.

The input signal f(x) is locally temporally coherent, but is spatially incoherent, such that:

$$<f(x_1)\cdot f(x_2)> = \delta(x_1-x_2) \tag{4}$$

wherein the angle brackets stand for temporal averaging.

Considering discrete signal processing, the input information contains N elements (i.e., N light emitting elements of a light source or modulated light elements). Assume that the output information is sampled N times. The samples in the output plane (i.e., detected output signal) are thus:

$$F(k) = \sum_{n=0}^{N-1} f(n)\cos\left(\frac{\pi n k}{N}\right) \tag{5}$$

Here, the constant bias has been omitted. It is assumed here that a matching condition between the input and output signals is satisfied (as will be described further below).

The above equation (5) presents one possible definition of a DCT (DCT-I). It should be understood that another definitions of DCT could be obtained, defined by appropriate sampling locations at the output plane.

FIGS. 3A–3E, illustrate several possible examples for arranging light emitting elements for use in light source 12 of an system 10 for obtaining N-elements discrete input signal IS, in accordance with various embodiments of the invention.

Figure 3A:
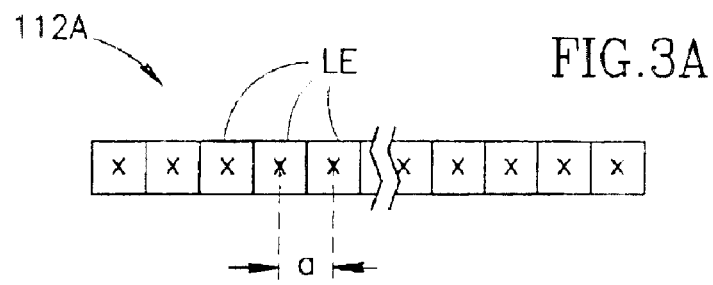
FIGS. 3A to 3E illustrate several possible examples for a light emitting elements arrangement suitable for use in a light source of the system of FIG. 2, accordance with embodiments of the invention.

A simple example is shown in FIG. 3A. The input signal IS is formed by a one-dimensional array 112A of N light emitting elements, generally indicated as LE. Such an array may be an array of VCSELs or a laser diode array. The minimal size of array 112A is determined by a pitch size a, i.e., the space between the centers of two adjacent elements LE. Hence, the total length of the array 112A cannot be less than the product N·a.

In some applications, where tens or even hundreds of light emitting elements are required to form an input signal, such one-dimensional array 112A will significantly increase the dimensions of the entire system, and will be very complicated to manufacture. Manufacturing limitations may include the maximum number of light emitting elements that can be produced into one array, and/or the minimal distance (pitch) between each two adjacent light sources in this array.

FIGS. 3B–3E exemplify how the above limitations of a single one-dimensional array can be overcome. The method is based on the fact that a lensless 1-D shearing interferometer produces a one-dimensional output, with no explicit dependence on the other dimension. Generally, here, N input units (N elements of the input signal) are formed by m parallel arrays (pieces) each containing n light emitting elements, the entire number N of input units being thereby n·m. The number n of the elements in the pieces is defined by manufacturing capabilities and system dimensions. The n light emitting elements in each piece $A_i$ (i=1, ..., m) are linearly aligned in a spaced-apart relationship defining an x-axis, and the m pieces $A_i$ are aligned with offsets in one or both of the x- and y-axes.

Figure 3B:
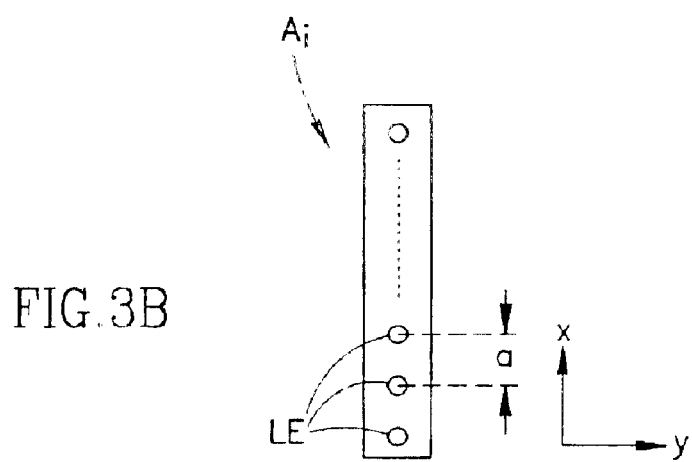
Figure 3C:
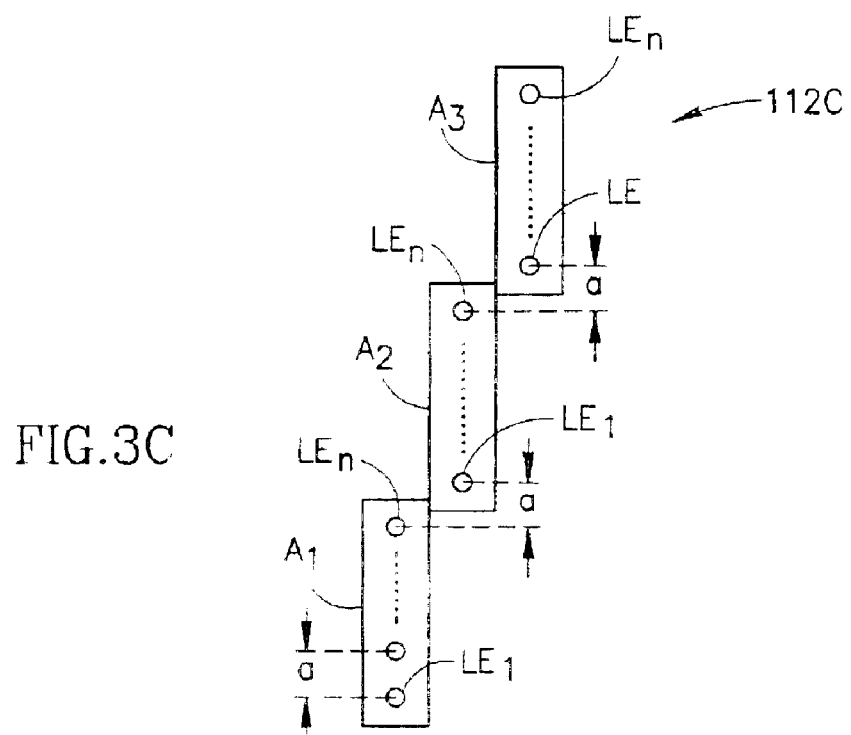
Figure 3D:
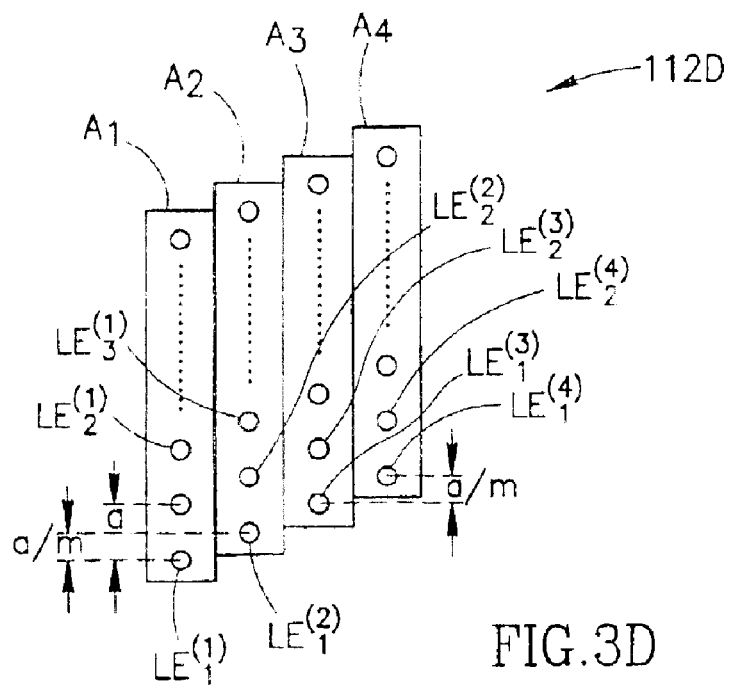
Figure 3E:
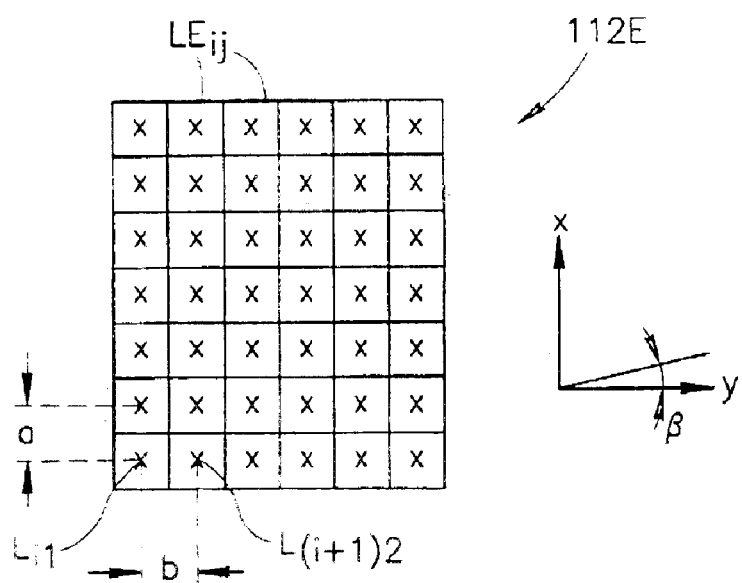

FIG. 3B illustrates one of the m pieces $A_i$ composed of n light emitting elements LE. FIGS. 3C–3E illustrate three different configurations, respectively, utilizing m arrays $A_i$, wherein the configuration of FIG. 3C overcomes the limitation associated with the light source array size, and the configurations of FIGS. 3D and 3E can generally overcome both manufacturing and space limitations.

In a light source 112C of FIG. 3C, the pieces $A_i$ (only three pieces $A_1$, $A_2$ and $A_3$ being shown in the figure) are shifted with respect to each other along the x-axis with a certain overlapping distance between each two locally adjacent pieces. This overlapping distance is determined such that the nth light emitting element $LE_n$ in the piece $A_i$ is separated by a distance a from the first light emitting element $LE_1$ in the piece $A_{i+1}$. It should be noted that for a one-dimensional shearing setup, only the distances along the x-axis are relevant (assuming the x-axis is the shearing symmetry axis of the setup).

In a light source 112D of FIG. 3D, the pieces $A_i$ (only pieces $A_1$–$A_4$ being shown in the figure) are shifted with respect to each other along the x-axis a distance of a/m. As a result, (m-1) light emitting elements of (m-1) successive pieces $A_{(2)}$, $A_{(3)}$, ... $A_{(m)}$, respectively, are aligned along the x-axis within the space between two locally adjacent light emitting elements of the piece $A_{(1)}$. As clearly seen in the figure, two locally adjacent light emitting elements $LE^{(1)}_1$ and $LE^{(1)}_2$ of the piece $A_1$ are aligned along the x-axis with the pitch a, and light emitting elements $LE^{(2)}_1$, $LE^{(3)}_1$ and $LE^{(4)}_1$ of pieces $A_2$, $A_3$ and $A_4$, respectively, are aligned along the x-axis within this space a, being spaced from each other the distance a/m; light emitting elements $LE^{(2)}_2$, $LE^{(3)}_2$ and $LE^{(4)}_2$ are located within the space between the elements $LE^{(1)}_2$ and $LE^{(1)}_3$; etc.

FIG. 3E illustrates a light source 112E in the form of m×n matrix (block) of light emitting elements $LE_{ij}$ (i=1, ..., m; j=1, ..., n). In the present example: m=6 and n=7. The light emitting elements $LE_{ij}$ are aligned in a spaced-apart relationship along the x- and y-axes with pitches a and b, respectively.

It is understood that, when the block 112E is tilted by an angle β, pitches between two adjacent light emitting elements $LE_{i1}$ and $LE_{(i+1)_2}$ along the x- and y-axes are, respectively, a·cos β and b·sin β, such that all of the light emitting elements (i.e., N=nm) are spaced along the x-axis with a pitch (a·cos β)/n between each two adjacent light emitting elements. To this end, it is helpful if the angle β satisfies the following condition: a·cos β=n·b·sin β. It should be noted that this configuration has an advantage for a two-dimensional shearing setup. As far as there is flexibility with respect to the numbers n and m, this configuration allows for the pitches between the light emitting elements along the x- and y-axes. If, for example, the matrix is symmetric (m=n) and β=45°, then the spacing along the x- and y-axes are equal.

The DFT, $\{\tilde{u}_k\}$, of an N-sample sequence, $\{u_m\}$, is defined as follows, for the discrete Fourier Transform:

$$\tilde{u}_k = \sum_{m=0}^{N-1} u_m \exp\left(-\frac{j2\pi}{N}mk\right) \text{ with } k = 0, 1, \ldots, N-1 \quad (6)$$

The output signal can be split into its real and imaginary parts:

$$\tilde{u}_k = \sum_{m=0}^{N-1} \left[\text{Re}\{u_m\}\cos\left(\frac{2\pi}{N}mk\right) + Im\{u_m\}\sin\left(\frac{2\pi}{N}mk\right)\right] + \quad (6b)$$

$$i\sum_{m=0}^{N-1} \left[Im\{u_m\}\cos\left(\frac{2\pi}{N}mk\right) - \text{Re}\{u_m\}\sin\left(\frac{2\pi}{N}mk\right)\right]$$

It is clear that the output is a combination of type I cosine and sine transforms of the real and the imaginary parts of the input, provided that only even samples are considered. Although equation (6b) is not the only possible decomposition, it shows that the capability to perform type I cosine and sine transforms is sufficient for obtaining a DFT of an arbitrary complex function. It is understood that since the real and imaginary parts of the output are space coincident, the real and imaginary parts are not separable.

A case of particular interest is when the output of the DFT is real. In order to obtain a real output of the DFT, the input sequence $\{u_m\}$ must be conjugate symmetric as in a case of complex valued $\{u_m\}$, i.e., $u_m = u^*_{-m}$. As particular cases, the DFT of a symmetric real input or an antisymmetric imaginary input are also real. A conjugate symmetric vector can be constructed from an arbitrary complex valued vector $\{u_m\}$, by defining a 2N-sequence, namely $\{v_m\}$, obtained by adding a mirror image to the real part of $\{\tilde{u}_k\}$ and a sign reverted mirror image (anti-symmetric) to its imaginary part, namely, as follows:

$$\{v_m\} = \{0, u_1, u_2, \ldots, u_{N-1}, 0, u^*_{N-1}, u^*_{N-1}, u^*_{N-2}, \ldots, u^*_1\} \quad (7)$$

The output of such a 2N-DFT is as follows:

$$\tilde{v}_k = \sum_{m=0}^{2N-1} v_m \exp\left(-\frac{j\pi}{N}mk\right) \quad (8)$$

$$= 2\left[\sum_{m=0}^{N-1} \text{Re}\{u_m\}\cos\left(\frac{\pi}{2N}mk\right) + \sum_{m=0}^{N-1} Im\{u_m\}\sin\left(\frac{\pi}{2N}mk\right)\right]$$

The above expression (8) presents cosine and sine transforms of, respectively, the real and the imaginary part of the input $\{u_m\}$.

For the optical implementation, a source located at position $x_0$ in the (x,y)-plane produces a complex amplitude at the $(\tilde{x}, \tilde{y})$-plane separated a distance z from the source. Assuming Fresnel approximation, this complex amplitude is as follows:

$$u_z(\tilde{x}) = \exp\left(-\frac{j\pi}{\lambda z}(\tilde{x} - x_0)^2\right) \qquad (9)$$

In the shearing interferometer setup, for each point in the input separated a distance $x_0$ from the origin of coordinates of the system, a mirror image is obtained at a distance $(-x_0)$. The mirror source will, in general, have a different phasing than the original source, due to the reflection or the different paths between both sources and the output plane. If $\phi$ is the phase added to the mirror image, the total field of a set of N sources (light emitting elements) with the spacing $\Delta x$ and amplitudes $\{u_m\}$ is determined by the following equation (10):

$$u_z(\tilde{x}) = \sum_{m=0}^{N-1} u_m \exp\left(-\frac{j\pi}{\lambda z}(\tilde{x} - m\Delta x)^2\right) +$$

$$\sum_{m=0}^{N-1} u_m \exp\left(-\frac{j\pi}{\lambda z}(\tilde{x} + m\Delta x)^2 + j\phi\right)$$

$$= \sum_{m=0}^{N-1} u_m \exp\left(-\frac{j\pi}{\lambda z}(\tilde{x}^2 + m^2\Delta x^2)\right)$$

$$\left[\exp\left(\frac{j2\pi}{\lambda z}m\tilde{x}\Delta x\right) + \exp(j\phi)\exp\left(-\frac{j2\pi}{\lambda z}m\tilde{x}\Delta x\right)\right]$$

$$= \sum_{m=0}^{N-1} u_m \exp\left(-\frac{j\pi}{\lambda z}(\tilde{x}^2 + m^2\Delta x^2)\right)\exp\left(j\frac{\phi}{2}\right)$$

$$\left[\exp\left(j\left(\frac{2\pi}{\lambda z}m\tilde{x}\Delta x - \frac{\phi}{2}\right)\right) + \exp\left(-j\left(\frac{2\pi}{\lambda z}m\tilde{x}\Delta x - \frac{\phi}{2}\right)\right)\right]$$

$$= 2\sum_{m=0}^{N-1} u_m \exp\left(-\frac{j\pi}{\lambda z}(\tilde{x}^2 + m^2\Delta x^2)\right)\exp\left(j\frac{\phi}{2}\right)\cos\left(\frac{2\pi}{\lambda z}m\tilde{x}\Delta x - \frac{\phi}{2}\right)$$

For input sources that are mutually incoherent, when the output is sensed in a square law detector, the detected intensity is:

$$I_z(\tilde{x}) = 2\sum_{m=0}^{N-1} |u_m|^2 \cos^2\left(\frac{2\pi}{\lambda z}m\tilde{x}\Delta x - \frac{\phi}{2}\right) \qquad (11)$$

$$= \sum_{m=0}^{N-1} |u_m|^2 \left[1 + \cos\left(\frac{4\pi}{\lambda z}m\tilde{x}\Delta x - \phi\right)\right]$$

$$= \sum_{m=0}^{N-1} |u_m|^2 + \sum_{m=0}^{N-1} |u_m|^2 \cos\left(\frac{4\pi}{\lambda z}m\tilde{x}\Delta x - \phi\right)$$

Except for an additive factor, the output is a harmonic transformation of the intensities in the input sources. Sampling the output with an interval $\Delta \tilde{x}$, the following final result is obtained:

$$I_z(\tilde{x} = k\Delta\tilde{x}) = I_k = \sum_{m=0}^{N-1} |u_m|^2 + \sum_{m=0}^{N-1} |u_m|^2 \cos\left(\frac{4\pi}{\lambda z}mk\Delta\tilde{x}\Delta x - \phi\right) \qquad (12)$$

The results depend on the phase $\phi$, as follows:
if $\phi = 0$, the output of the interferometer is a cosine transform;
if $\phi = \pi$, the output of the interferometer is a minus cosine transform;
if $\phi = \pi/2$: the output of the interferometer is a sine transform.

It is this evident that the relation between the result in (12) and the output for the DFT of a conjugate symmetric function (equation (8) above) is straightforward since $\phi$ determines whether symmetric or anti-symmetric input is used for the interference and subject to application of a matching condition. It should be noted that, in order to obtain the mathematical transform (8) by the optical transform (12), the following matching condition should be satisfied:

$$\frac{4\pi}{\lambda z}mk\Delta\tilde{x}\Delta x = \frac{\pi}{N}mk \qquad (13)$$

or $$4N\Delta\tilde{x}\Delta x = \lambda z$$

Here, $\Delta x$ is the location of a specific pixels in the input signal, $\Delta\tilde{x}$ is the location of the corresponding pixels in the output signal, m and k are numbers of the pixels in the input and output signals, respectively, and z is the distance between the input and output planes. Such a matching results with DCT-I and DST-I transforms of the real and the imaginary part, respectively, of the original input $\{\hat{u}_k\}$.

It should be understood that in order to practically optically realize DFT of Conjugate symmetric input (i.e., equation (7) above), as required in an OFDM (Orthogonal Frequency Division Multiplex), by performing DCT and DST of the original complex, the input is split into real and imaginary parts and each part is treated separately in the optical system. The sampling and the matching conditions can be adjusted to obtain other discrete transform definitions, as described below.

In order to optically perform a DFT transform of a conjugate symmetric input, two separated optical systems with different optical path difference are desirable. This does not substantially change the geometry of the setup, and parallel fringes are still obtained in the output plane. Since a fast phase change is generally difficult to achieve, optical assembly 14 (FIG. 2) is generally composed of two separate setups, one for the DCT and the other for the DST.

Figure 4:
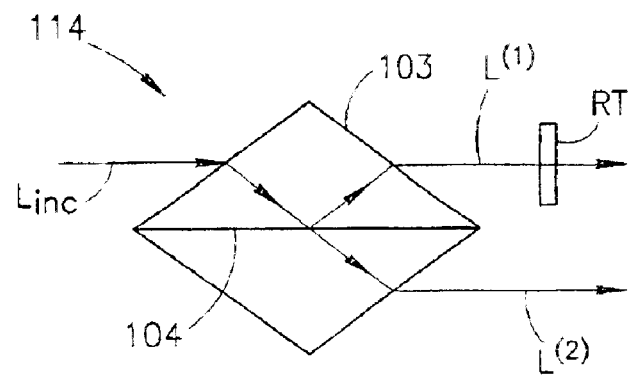
FIG. 4 illustrates an example of a cubic beam splitter based optical assembly suitable to be used in the system of FIG. 2, in accordance with an embodiment of the invention.

FIG. 4 illustrates an example of such an optical assembly 114, in which a cubic beam splitter 103 is utilized such that incident light $L_{inc}$ (generated by a light source, which is not specifically shown) propagates towards beam splitter 103 parallel to its diagonal side 104, which acts as an interface. While propagating through the beam splitter and impinging onto the interface 104, the incident light beam is split into two parts (i.e., light components reflected and transmitted through the interface 104, respectively). Thus, two output beams $L^{(1)}$ and $L^{(2)}$ are produced, which are capable of interfering with each other. Beams $L^{(1)}$ and $L^{(2)}$ further propagate along spatially separated optical paths (presenting two setups, respectively). In the present example, a desired phase difference between the output beams is achieved by providing one of the setups, e.g., that associated with the propagation of beam $L^{(1)}$, with a retarder RT (e.g., phase plate). It should, however, be noted that the same result could be achieved by fabricating the diagonal side 104 in the form of a multilayer structure that adjusts one or both of the phase of one of the beams for either cosine or sine transform.

Figure 5:
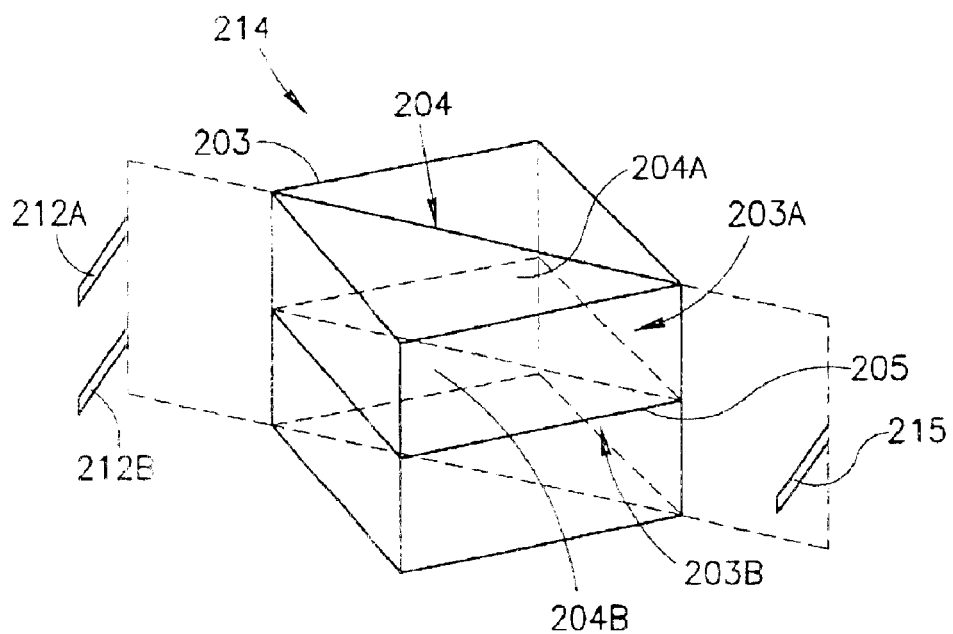
FIG. 5 illustrates another example of a cubic beam splitter based optical assembly suitable to be used in the system of FIG. 2, in accordance with an embodiment of the invention.

According to another example shown in FIG. 5, the design of a cube beam splitter based optical assembly 214 one can parallelize for DFT of a conjugate symmetric input, as required for example in ADSL communication systems. Here, two separate setups (optical paths) of light propagation are created by dividing a beam splitter 203 into two halves, an upper part 203A and a lower part 203B, located at opposite sides of a plane 205. Upper and lower parts 204A and 204B of a diagonal side 204 are fabricated so as to provide appropriate phase difference between transmitted and reflected light components. To this end, the upper part 204A has a coating of a kind producing no phase shift between transmitted and reflected beams, while the lower part 204B produces a $\pi/2$ phase shift. Separate light source arrays 212A and 212B are provided for producing, respectively, the real and imaginary parts of an input signal and directing them into the optical assembly 214. A detector array 215 is appropriately mounted in the output plane, and is preferably oriented such that its axis intersects with the bisection line 205. The detector 215 senses the addition of the cosine and sine transforms of the light source arrays, respectively. Alternatively, by operating the input sources in two different cycles, DCT and DST transforms can be obtained sequentially. Alternatively, multiple sets of detectors can be provided. In this an other embodiments, in which a coating is used to introduce a phase shift at the beam splitter, a phase shifter (such as a coating at an output surface of the structure or a separate phase shifter in one of the paths) may be used in some embodiments.

Figure 6A:
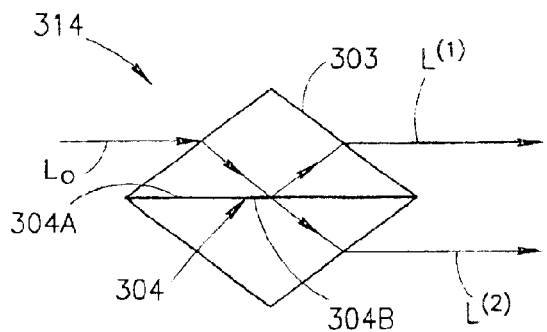
FIGS. 6A and 6B illustrate two more examples of a cubic beam splitter based optical assembly suitable to be used in the system of FIG. 2, in accordance with embodiments of the invention.
Figure 6B:
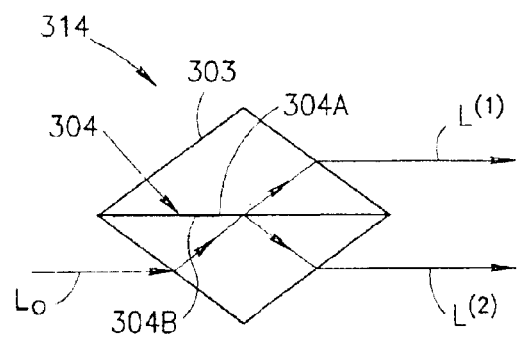

Turning now to FIGS. 6A and 6B, there is illustrated an optical assembly 314 utilizing a cube beam splitter 303 having its diagonal side 304 formed with a multilayer coating designed such that the relative phase between transmitted and reflected beams either $L^{(1)}$ or $L^{(2)}$ is different, depending on the direction of input beam propagation towards the interface 304 (diagonal side). If the input beam $L_0$ impinges onto the diagonal side at its surface 304A (FIG. 6A), the resultant phase difference is 0, and if it impinges onto the opposite surface 304B (FIG. 6B), the resultant phase difference is $\pi/2$.

Figure 7:
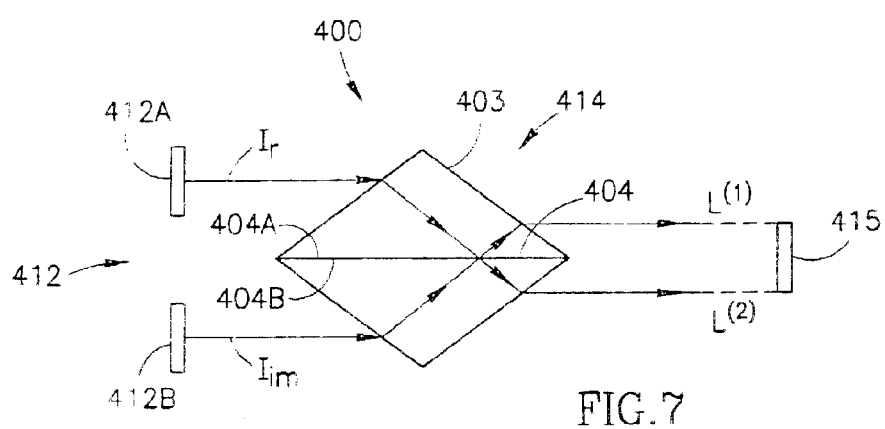
FIG. 7 more specifically illustrates an example of the system of FIG. 2 designed for directly obtaining DCT and DST of a conjugate symmetric input signal in an output plane, in accordance with an embodiment of the invention.

FIG. 7 (which is structurally the same as FIG. 6) illustrates an example of a system 400 designed for directly obtaining DCT and DST of the conjugate symmetric input signal in the output plane. As shown, a light source 412 is a two-part source, the source parts 412A and 412B generating, respectively, real and imaginary parts $I_r$ and $I_{im}$ of the input signal. An optical assembly 414 includes a cube beam splitter 403, configured with respect to light source parts 412A and 412B such that the light components $I_r$ and $I_{im}$ impinge onto the opposite surfaces 404A and 404B, respectively, of the diagonal side 404. Output beams $L^{(1)}$ and $L^{(2)}$ propagate towards a detector 415 located in the output plane.

Figure 8A:
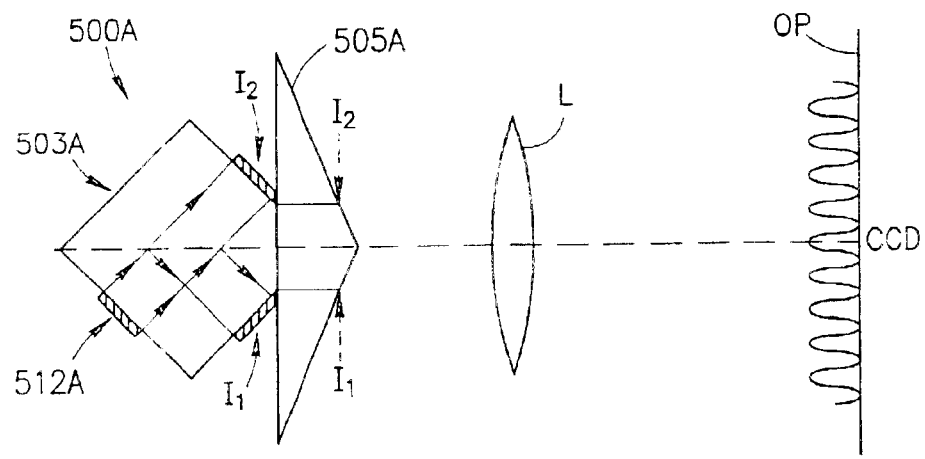
FIGS. 8A and 8B illustrate two more examples, respectively, of the system according to an embodiment of the invention, utilizing a cubic beam splitter based shearing interferometer.
Figure 8B:
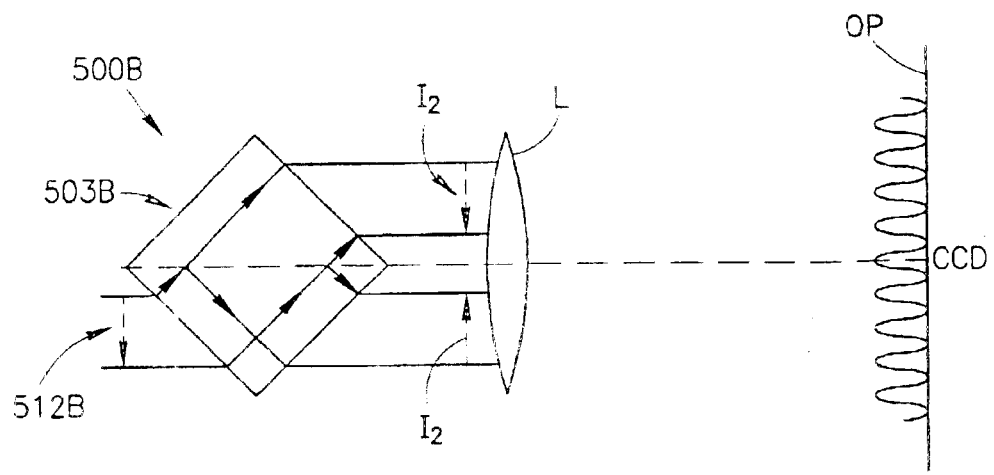

FIGS. 8A and 8B illustrate two more examples, respectively, of embodiments of the invention, utilizing a cube beam splitter based shearing interferometer. The cube beam splitter is accommodated such that its inner reflecting surface extends along the optical axis of light propagation through the system.

In a system 500A (FIG. 8A), a VCSEL array (light source) 512A presenting an input signal is located at one side of a cube beam splitter 503A. Light propagation through the beam splitter results in the creation of a first image $I_1$ and a second, inverted image $I_2$ of the VCSEL array 512A. A prism 505A is accommodated in the optical path of images $I_1$ and $I_2$ so as to ensure the parallel propagation of these light components towards the output plane OP in which a sensing surface of a detector (e.g., CCD) is located. Further provided in system 500A is an imaging lens L, which is installed in the optical path of the light components exiting from the prism and concentrates the fringe pattern from all the VCSEL elements at the center.

In a system 500B (FIG. 8B), a VCSEL array 512B is situated at an angle to a cube beam splitter 503B, such that light components exiting from the beam splitter and representing two images $I_1$ and $I_2$ of the VCSEL array, are spatially separated and propagate parallel to the optical axis. Similarly, the imaging lens L concentrates the fringe pattern from all the VCSEL elements at the center. This optical setup provides propagation of both images without any additional optical elements.

Figure 9A:
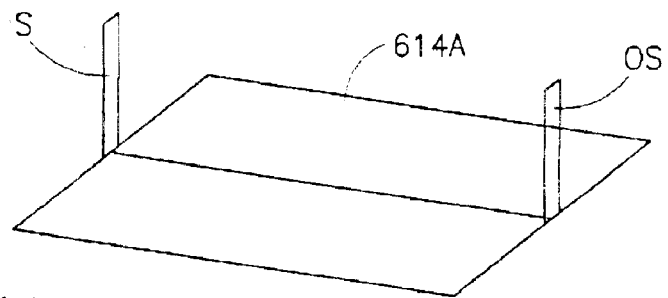
FIGS. 9A to 9C illustrate three mirror-based setups, respectively, suitable to be used in the optical assembly of the system of FIG. 2, according to embodiments of the invention.
Figure 9B:
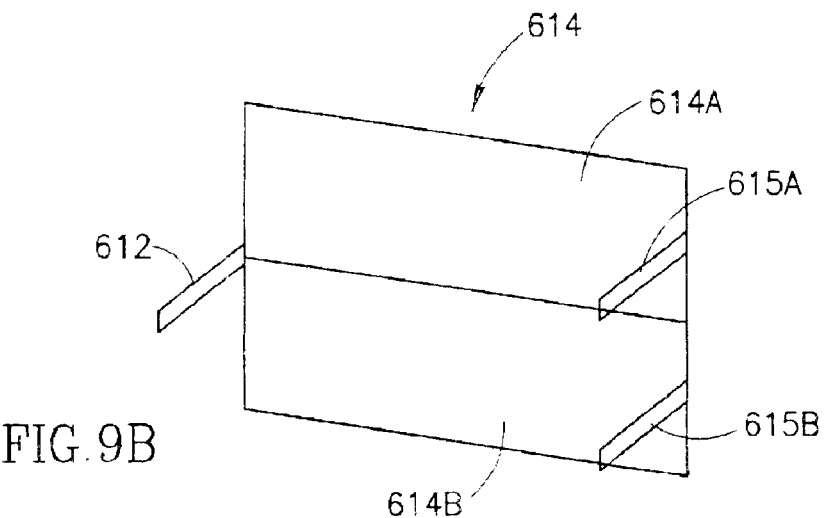
Figure 9C:
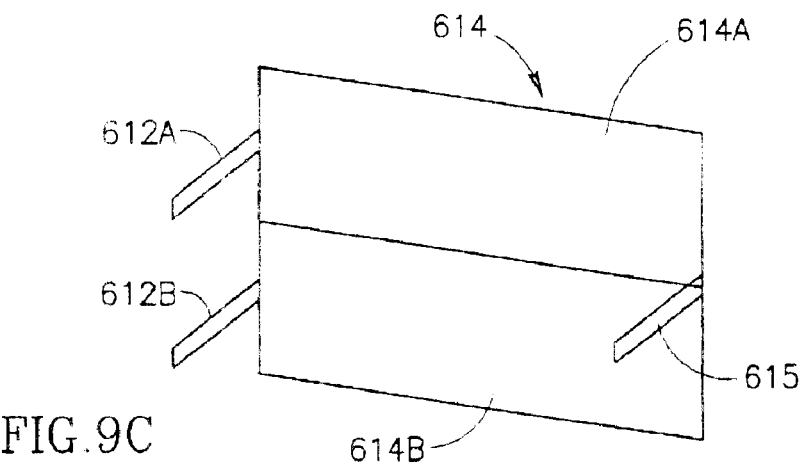

Reference is now made to FIGS. 9A–9C, illustrating mirror-based setups suitable to be used in the optical assembly. As shown in FIG. 9A, the shearing can be obtained with a single mirror 614A. The selection of the type of mirror plays a fundamental role. For practical considerations (e.g., setup and detector dimensions, resolution), the shearing requires a substantially grazing angle of incidence (e.g., close to $\pi/2$).

A DCT transform can be obtained using a metallic mirror (single reflection in a metal). The use of such a mirror will result in a phase difference between incident and reflected beams of nearly $\pi$ radians for grazing incidence. This generates a pair of images (one real and one imaginary) suitable for providing a DCT. It should be noted that the phase and amplitude changes with the angle of incidence faster when the polarization of incident light is parallel to the plane of incidence. Therefore, perpendicular polarization is preferably used. By coating the surface with a phase retarding material, the phase of the reflected wave can be reversed, so that the two images are suitable for a DST.

A dielectric interface (single reflection in the interface between two dielectric media) may be used. Alternatively or additionally, internal and/or external reflection is used. In the case of internal reflection, the refraction index of that side of the interface where the emitters and detectors are places is larger than that of its opposite side. At grazing incidence, although the modulus of the reflection coefficient is unity for both polarization states, the phase varies as a function of the angle of incidence. Therefore, at grazing incidence, the DCT can be obtained, while at the angle of incidence providing $\pi/2$ phase difference with a single polarization state, the setup may be used to obtain the DST. In the case of external reflection, the refraction index of that side of the interface where the emitters and detectors are placed is smaller than that of the opposite side of the interface. The phase is exactly $\pi$ for a wide range of incidence angle for the two polarization states, thereby enabling to carry out the DCT. The amplitude varies faster in the case of parallel polarization. If either parallel or perpendicular polarization are used, the only effect will be a different weighting factor for every frequency in the DCT. This error is correctable, for example, by pre-weighting the intensity of the sources.

An interface coating can be used, namely, the mirror's surface, metallic or dielectric, can be formed with single or multilayer coating. The design of the number of layers, refractive indices and thickness can provide any desired phase difference between incident and reflected beams for a given polarization. Hence, it is possible to obtain either a DCT or a DST transform.

FIG. 9B exemplifies a combination of mirrors suitable for simultaneously obtaining DCT and DST of an input function by combining $\pi$ (or 0) and $\pi/2$ phase differences between incident and reflected beams. Here, a mirror 614 is divided into two parts 614A and 614B, the upper mirror-part 614A being a metallic or dielectric mirror providing a $\pi$ phase shift, and the lower mirror-part 614B being a multilayer mirror, providing $\pi/2$ phase. That light component of input light which, whilst propagating from an input source 612 towards an upper array of detectors 615A impinges onto the mirror part 614A, is reflected therefrom without phase shift. The DCT is thereby obtained on the array 615A. As for the light component of the input light interacting with the lower mirror part 614B, it undergoes a $\pi/2$ phase shift. Therefore the lower photodetector array 615B will sense the DST.

The optical setup would need two cycles for a DFT transformation of a hermitic vector. In the first cycle, the real part is presented in the array, and the DCT is sensed in the upper detectors 615A (corresponding to the metallic mirror). In a second cycle, the imaginary part is displayed, and the DST is sensed in the lower detectors 615B (corresponding to the dielectric reflection).

As shown in the example of FIG. 9C, by slightly modifying the above setup, the DFT of a hermitic vector can be obtained in one cycle. To this end, two separated arrays of sources 612A and 612B, e.g., for the real and imaginary parts, respectively, are used. Source 612A corresponding to the real part is confronted with the mirror-part 614A introducing no phase change, while the imaginary part associated source 612B faces the mirror-part 614B with a π/2 phase shift. The DFT of the input is sensed in a detector array 615.

In the above description, special emphasis has been made on the calculation of DFT of a conjugate symmetric vector. As particular cases, DCT and DST of real vectors can be obtained. The general case of DFT, as defined by equations (6) and (6b) above, requires four real transformations (DST or DCT), that can be achieved in a similar fashion to the above descriptions or by using two cycles in those systems, each with a different input.

It should be noted that DST and DCT could be obtained with the same shearing interferometer but with the input signal having 3N elements, where N of them are zeros. The first element of the object is shifted by N with respect to an axis of light propagation through the interferometer, and for the input signal f'(n) we have:

$$f'(n) = \begin{cases} f(n-N) & N \le n \le 3N \\ 0 & \text{otherwise} \end{cases} \quad (14)$$

In this case, for the same size of the input object, 50% more length units at the input plane are required, as compared to the previous case with the "non-shifted object". For the output signal F'(k), we have:

$$F'(k) = \sum_{n=N}^{3N-1} f'(n)\cos\left(\frac{\pi n k}{2N}\right) = \sum_{m=0}^{2N-1} f(m)\cos\left(\frac{\pi k(m+N)}{2N}\right) \quad (15)$$
$$= \sum_{m=0}^{2N-1} f(m)\left\{\cos\left(\frac{\pi k m}{2N}\right)\cos\left(\frac{\pi k}{2}\right) - \sin\left(\frac{\pi k m}{2N}\right)\sin\left(\frac{\pi k}{2}\right)\right\}$$

wherein m is the coordinate describing the location of the input elements in the input plane of the original non-shifted object, and k is the coordinate describing the locations of the discrete output elements of the transform. It should be noted that in these notations, n, m and k are dimensionless. The following change of variable was conducted:

$$m = n - N \quad (16)$$

Since only half of the f(m) elements differ from zero, equation (15) can be rewritten:

$$\sum_{m'=0}^{N-1} f(m)\left\{\cos\left(\frac{\pi k' m'}{N}\right)\cos(\pi k') - \sin\left(\frac{\pi k' m'}{N}\right)\sin(\pi k')\right\} \quad (17)$$

wherein additional variable changes are used:

$$m' \equiv \frac{m}{2},$$

m'=0,1, ... N−1 and $$k' \equiv \frac{k}{2}, k' = 0, \frac{1}{2}, 1, \frac{3}{2} \ldots N - 1.$$

The behavior of the function F'(k) is as follows:

For samples at k=0,2,4, ..., exactly the cosine transform, C(k), is obtained;

For samples at k=1,3,5, ..., the minus cosine, −C(k), is obtained which is the DCT-I;

In order to describe the Sine transform, the variable k' will be changed to j such that $$j = k' - \frac{1}{2}, k' = \frac{1}{2}, \frac{3}{2} \ldots N - \frac{1}{2}.$$

For the term of the sine only it is found that:

$$\sum_{m'=0}^{N-1} f(m)\left\{-\sin\left(\frac{\pi\left(j+\frac{1}{2}\right)m'}{N}\right)\sin\left(\pi\left(j+\frac{1}{2}\right)\right)\right\}$$

For samples at j=0, 2, ..., a sine transform, S(k), is obtained; and

For the last set of samples, 1, 3, 5, ..., a minus sine transform, −S(k), is obtained which is the DST-II transform.

Figure 10A:
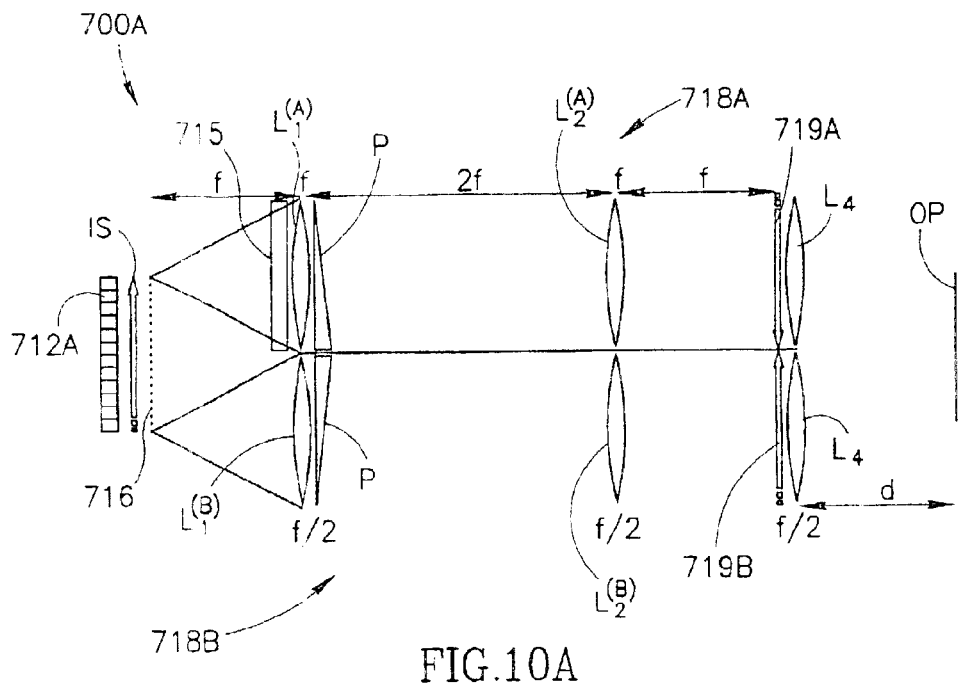
FIGS. 10A and 10B show two possible examples of the implementation of the system of FIG. 2 suitable for processing one-dimensional objects, in accordance with embodiments of the invention.
Figure 10B:
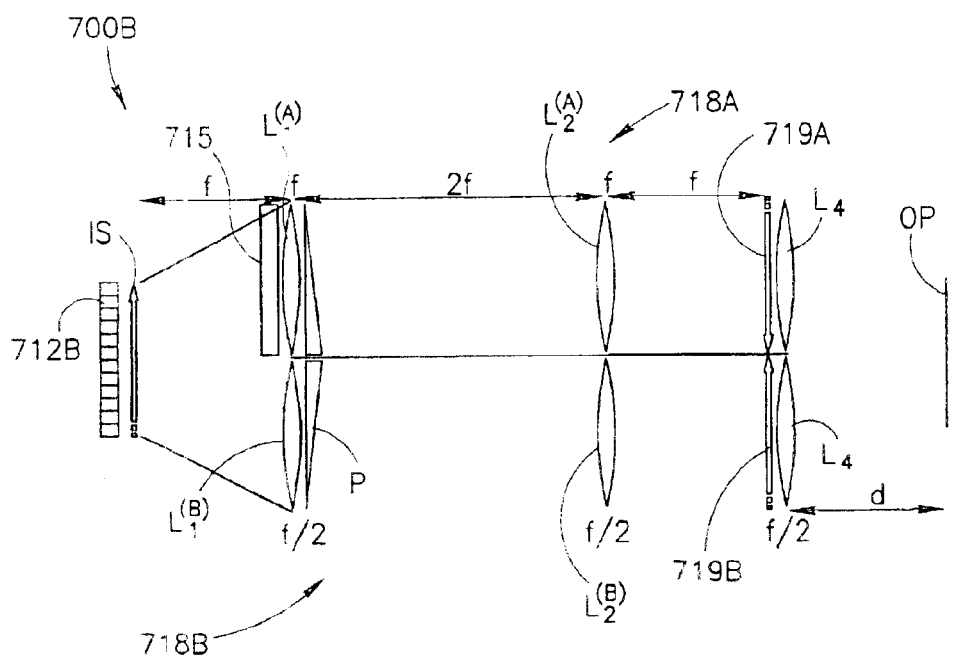

Turning now to FIGS. 10A and 10B, there are illustrated two possible examples of the implementation of an optical system according to embodiments of the invention.

In a system 700A, shown in FIG. 10A, a light source 712A has relatively narrow beam divergence, as compared to a light source 712B of a system 700B (FIG. 10B). Generally, the light source 712A does not have sufficient divergence to illuminate the region of interest in output plane by all the points in the modulated input signal. Consequently, system 700A also comprises a splitting sub-assembly 716 in the form of a diffractive optical element (DOE) that splits the input image IS into two light components, which then propagate along two optical paths (channels), respectively, defined by optical setups 718A and 718B. The splitting sub-assembly 716 provides diffraction angles greater than the divergence of the light source 712A, but is limited in angle to avoid any overlap between the two channels (paths) of light propagation. The design of such DOE 716 can be based on the channels' dimensions. As for the system 700B (FIG. 10B), it utilizes a light source comprising suitable LEDs or VCSELs which are characterized by sufficiently wide divergence, thereby eliminating the need for a splitting means.

The imaging setups 718A and 718B are designed to create, respectively, an inverted image 719A and a non-inverted image 719B of the input signal IS. In this specific example, the setup 718A comprises two identical lenses $L^{(A)}_1$ and $L^{(A)}_2$, wherein lens $L^{(A)}_1$ is situated such that DOE 716 is located in its back focal plane. Lenses $L^{(A)}_1$ and $L^{(A)}_2$ are spaced from each other a distance 2f along an optical axis of imaging setup 718A, wherein f is the focal length of the lens $L^{(A)}_1$ and $L^{(A)}_2$. Setup 718B is composed of two identical lenses $L^{(B)}_1$ and $L^{(B)}_2$ each having the focal length f/2. Lenses $L^{(B)}_1$ and $L^{(B)}_2$ are positioned similar to lenses $L^{(A)}_1$ and $L^{(A)}_2$, namely lens $L(B)_1$ is spaced from the input image IS by a distance f, and from the lens $L^{(B)}_2$, by a distance 2f. In order to obtain a DST transform, a π/2 phase plate 715 is inserted in either one of the setups 718A and 718B—in the setup 718A in the present example. The phase plate 715 is located upstream of the lens $L^{(A)}_1$ (or $L^{(B)}_1$). This results in a π/2 phase shift between the two images (i.e., interfering signals), thereby providing a DST transform.

As further shown in the figures, each setup also comprises a prism P accommodated downstream of the lens $L^{(A)}_1$ (and lens $L^{(B)}_1$) proximate thereto. The provision of the prism P is optional and is aimed at appropriately deflecting light beams impinging thereon, so as to provide beams parallel to the optical axis of light propagation. Further optionally provided in the two setups, are field lenses and additional lenses $L_4$. The field lens is typically used for improving the efficiency of the optical system by ensuring that the light passes by one lens is directed into the subsequent lenses. As for the additional lenses, they aim to correct the spherical curvature of the images 719A and 719B.

Thus, setups 718A and 718B define two symmetrical optical paths with respect to an optical axis OA of light propagation through the system, for the propagation of corresponding light components impinging on lenses $L^{(A)}_1$ and $L^{(B)}_1$, respectively. Since each point in the image 719A is coherent with the corresponding point in image 719B, the two images interfere with each other. This construction is less complex and more compact, as compared to that of the conventional shearing interferometer shown in FIGS. 1A and 1B.

In the above examples of FIGS. 10A and 10B, two images of the input signal IS are provided (either by the use of a splitting sub-assembly or by the use of an appropriate light source), and one of the replicated images is appropriately inverted while both images propagate through the optical setups. System 700A (or 700B) defines a free space d for the light free space propagation aimed at producing the interference between the two images 719A and 719B in the output plane, thereby obtaining the DCT of the input signal. It should be noted that all the elements in FIGS. 10A and 10B including lenses and prisms could be implemented as diffractive optical elements.

In the above examples, each of the two imaging paths creates an output image with magnification equal to 1. The total length of the optical path is:

$$L = 4f + d \quad (20)$$

Considering the divergence angle α of the light source (or of the replication means, as the case may be) and the dimension Δx of the input object, in order to produce the necessary interference, the following condition should be satisfied:

$$\frac{\alpha d}{2} = 2\Delta x. \quad (21)$$

Thus, for Δx=16 mm, α=0.15 radians and f/2=8 mm, the total desired length L of the optical path is: L=490.7 mm.

Assuming that the lens parameters defining $f_0$ the amount of light collected by the lens (i.e., the so-called "lens' speed" $f_0$), which is determined as the ratio between the focal length and the diameter of the lens) is 2.5. Assuming that the light source used is VCSEL with a 250 μm pitch, then the maximal volume of the setup is determined as follows:

$$V = (2 \cdot 250 \; \mu m) \cdot \max\left\{\frac{f}{f_0}, \Delta x\right\} \cdot L = 3925.3 [mm^3] \quad (22)$$

wherein the coefficient 2 is associated with the two optical paths of the light propagation.

It can be noted that the performance of the entire system is determined inter alia by such main parameters as the size and coherence length of the light source. The coherent length is an extremely important parameter, since the formation of the interference pattern by all the pixels of an input image is achievable only if the coherence length of the source permits it. The following table summarizes these parameters for three main options for a light source.

|  | LED | Diode Laser | VCSELs |
|---|---|---|---|
| Size (μm) | 5–10 | 1–5 | 1–3 |
| Coherence length (mm) | 0.01–0.03 | 0.1–2 | 5–15 |

The coherence length Δ of the light source must be larger than the maximal light path differences $\Delta_h$, which can be approximated as:

$$\Delta_h = \sqrt{L^2 + (2\Delta x)^2} - L \approx \frac{2\Delta x^2}{L} \quad (23)$$

The coherence length Δ is determined by the properties of the light source resonator, that is:

$$\Delta = \mathfrak{I} \cdot h \quad (24)$$

wherein $\mathfrak{I}$ is the finesse number and h is the length of the resonator.

The relation between the coherent length Δ and the maximal light path differences $\Delta_h$ should satisfy the following condition:

$$\Delta > \Delta_h \quad (25)$$

Assuming the above values for Δx and L, the required coherence length should be:

$$\Delta_h = \frac{2 \cdot 16^2}{426} = 1.2 \; mm \quad (26)$$

As indicated above with regard to the optical length to be defined by the system so as to meet the requirements of the shearing interferometry, this length is governed by two conditions: the divergence of the light source that should ensure that each point source illuminates the whole output region of interest, and the matching condition between the input and output signals. The optical setups of FIGS. 10A and 10B are rather long, since they require the inner imaging length.

The above examples of FIGS. 10A and 10B are suitable for processing one-dimensional signals. The same processing can be done with a system of shorter configuration. This is exemplified in FIGS. 11A and 11B. Here, the two symmetric imaging channels of FIGS. 10A and 10B are replaced by asymmetric configurations with some demagnification.

Figure 11A:
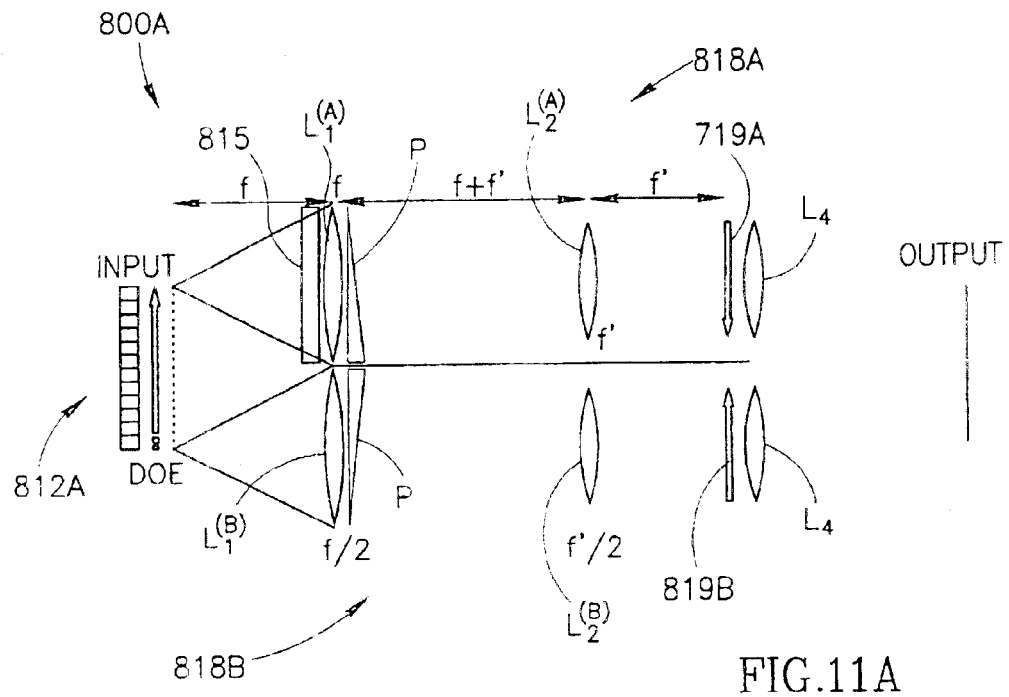
FIGS. 11A and 11B show other examples of apparatus according to embodiments of the invention suitable for processing one-dimensional signals, with more compact (e.g., shorter) configurations, as compared to those of the examples of FIGS. 10A and 10B.

In a system 800A of FIG. 11A, an imaging setup 818A comprises a phase plate 815, a lens $L^{(A)}_1$ with the focal length f, and a lens $L^{(A)}_2$ with the focal length f' such that f'<f. The demagnification factor of this channel is f'/f. An imaging setup 818B is composed of a lens $L^{(B)}_1$ with the focal length f/2, and a lens $L^{(B)}_2$ with the focal length f'/2. The setups 818A and 818B provide, respectively, the inverted and non-inverted (direct) images 819A and 819B, and are shorter than the setups 718A and 718B of FIGS. 10A and 10B. This is due to the following reasons:

Shorter focal lengths of the lenses result in a shorter setup; and

Owing to the demagnification factor, the angular divergence is f/f' higher, and consequently, the required distance for the shearing interference is shortened by the same factor.

For simplicity, the focal lengths of the upper part lenses $L^{(A)}_1$ and $L^{(A)}_2$ in the above example will be denoted by $f_1$ and $f_2$, and the, focal lengths of the lower part lenses $L^{(B)}_1$ and $L^{(B)}_2$ will be denoted by $f_1'$ and $f_2'$.

The demagnification of the upper part (setup 818A) is:

$$M = \frac{f_2}{f_1} \tag{27}$$

The demagnification of the lower part (setup 818B) is determined as follows:

$$\frac{1}{f_1} + \frac{1}{d_i} = \frac{1}{f_1'} \tag{28}$$

$$\frac{1}{f_1 + f_2 - d_i} + \frac{1}{f_2} = \frac{1}{f_2'}$$

$$M = \frac{d_i}{f_1} \cdot \frac{f_2}{f_1 + f_2 - d_i}$$

wherein $d_i$ is the position downstream of the first lens $L^{(B)}_1$, where the image of the input signal is created. In order to obtain equal magnifications in both channels 818A and 818B, this parameter $d_i$ should, in this specific example, satisfy the following condition:

$$d_i = \frac{f_1 + f_2}{2} \tag{29}$$

If $d_i$ satisfies the above condition, than for the focal lengths of the lower part lenses $L^{(B)}_1$ and $L^{(B)}_2$, we have the following relations:

$$f_1' = f_1 \left[ \frac{f_1 + f_2}{3f_1 + f_2} \right] \tag{30}$$

$$f_2' = f_2 \left[ \frac{f_1 + f_2}{f_1 + 3f_2} \right]$$

Thus, the total length L of the demagnification setup of FIG. 11A and the space d needed to be provided between the last lens in the setup and the output plane, are as follows:

$$L = 2f_1 + 2f_2 + d \tag{31}$$

$$d = \left( \frac{f_2}{f_1} \right)^2 \frac{4\Delta x}{\alpha}$$

Assuming again that $f_2 = 16$ mm, we have:

$$\frac{dL}{df_1} = 0 \rightarrow 2 - 2\frac{4\Delta x}{\alpha}\frac{f_2}{f_1^3} = 0 \rightarrow f_1 = \left( \frac{4\Delta x f_2}{\alpha} \right)^{1/3} \tag{32}$$

This means that $f_1 = 19$ mm, $f_1' = 9.1$ mm and $f_2' = 8.4$ mm. The total length L is thus 372 mm, and the total volume V is 2980 mm$^3$.

Figure 11B:
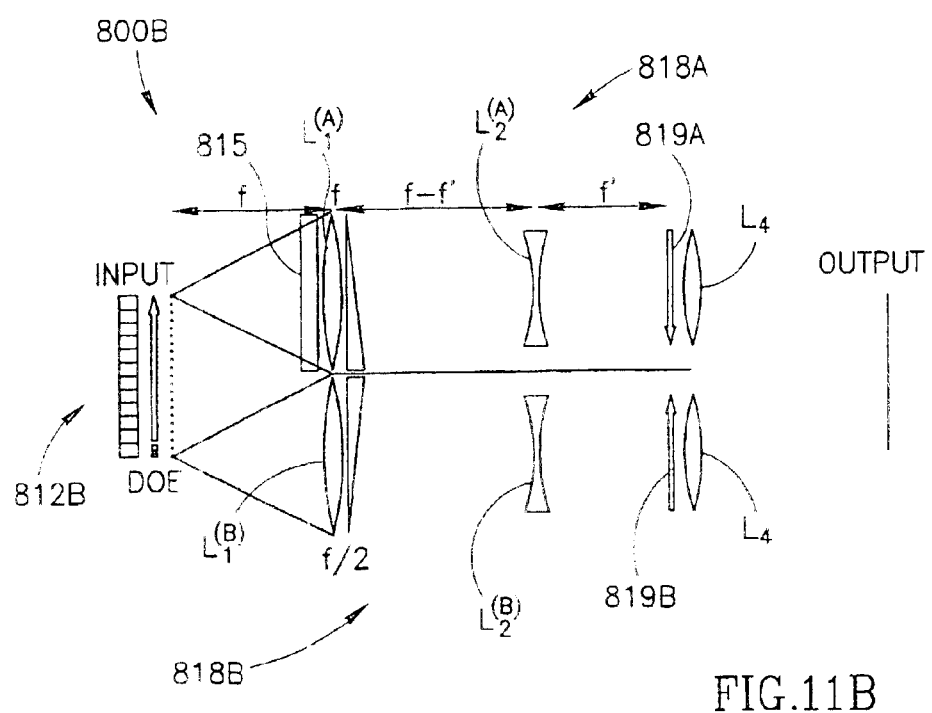

In the example of FIG. 11B, negative focal lenses $L^{(A)}_2$ and $L^{(B)}_2$ are used for the further reduction of the length and volume of the system. This implementation also utilizes a demagnification factor that enables a reduced shearing interference length. In this case, if the lenses are still positioned in the same locations, the focusing is obtained at a distance of $(-f_2)$ relatively to the last lens. Thus, the total length L will be:

$$L = 2f_1 + d \tag{33}$$

Here, d is greater than $f_2$.

In order to maintain the elements of the lower path in their positions, the following condition should be satisfied:

$$\frac{1}{f_1} + \frac{1}{d_i} = \frac{1}{f_1'} \tag{34}$$

$$\frac{1}{f_1 + f_2 - d_i} - \frac{1}{f_2} = -\frac{1}{f_2'}$$

For the same demagnification M, we have:

$$f_1' = f_1 \left[ \frac{f_1 + f_2}{3f_1 + f_2} \right] \tag{35}$$

$$f_2' = f_2 \left[ \frac{f_1 + f_2}{f_1 - f_2} \right]$$

Thus, in the example of FIG. 11B, similar to that of FIG. 11A, the focal lengths of the lenses should satisfy the following condition: $f_1 > f_2$. Assuming that $f_2 = 16$ mm, $f_1 = 19$ mm, $f_1' = 9.1$ mm, we have: $f_2' = 186.7$ mm, $d = 302.5$ mm, and $L = 340.5$ mm.

Utilizing the above equation (22), the volume is V=2720 mm$^3$, if $f_0$ is greater than 11. Hence, the input plane, and not the numerical apertures of the lens, is the restricting dimension. Such a value of $f_0$ (i.e., $f_0 = 1$) is not high enough to damage the resolution since the pitch is only 250 µm. Indeed:

$$2.44 \lambda f_0 = 2.44 \cdot 0.86\ \mu \cdot 11 < 250\ \mu m$$

As indicated above, in order to produce spatially modulated light (i.e., input signal) indicative of an input object, the light source is typically equipped with a spatial light modulator (SLM). By using VCSELs, however, the need for such an SLM can be eliminated. This is due to the fact that VCSELs are characterized by ultra fast modulated components (up to 3 GHz) and high light intensity (up to 1 mwatt per single VCSEL source). Thus, when using an 8×8 VCSEL array at the input plane in a system according to an embodiment of the invention, there is no need for any spatial light modulator (subject to the availability of a fast enough 8 by 8 Photo Diode Array (PDA)). VCSELs can be modulated to present the block images and at the output, the DCT will be optically achieved. For instance, if a PDA of 500 MHz is used, then:

$$500 \cdot 10^6 \cdot 64 = 32\ GHz/S$$

Figure 12:
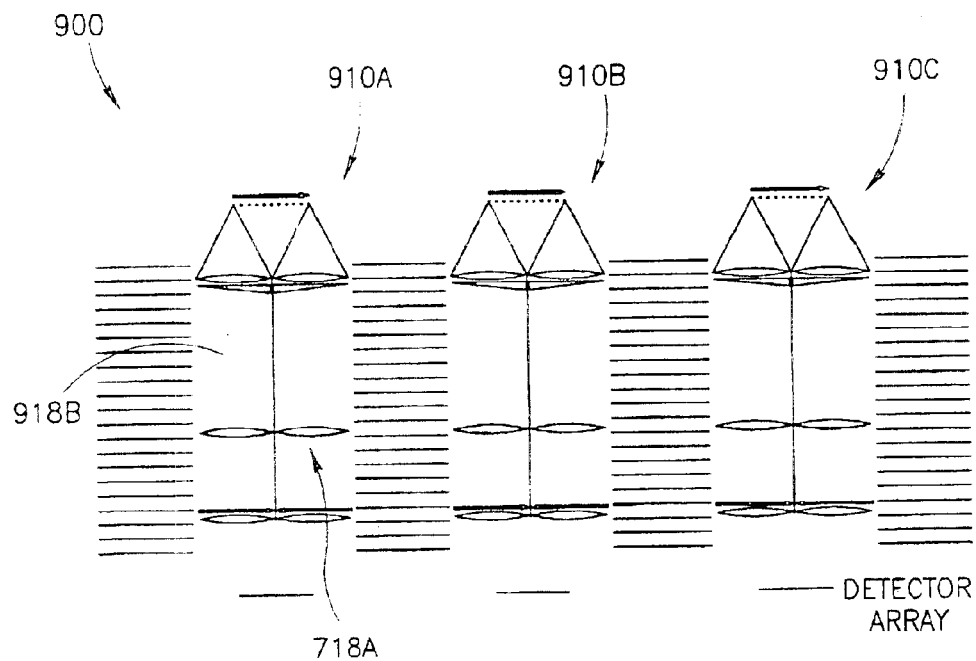
FIG. 12 illustrates a system according to an embodiment of the invention utilizing a multi-channel setup, each constructed in a manner similar to the system of FIG. 2.

In other words, when a 8×8 VCSEL block is used (i.e., 64 channels operating in parallel), the total transmission speed (from all the channels together) is about 32 GHz/s Referring to FIG. 12, there is illustrated a system 900, utilizing a multi-channel setup—three channels 910A–910D in the present example, wherein each of these channels is constructed similarly to the above described system 700. Namely, each of the channels 910A–910D is composed of two sub-channels 718A and 718B constructed as described above. It should be understood that the sub-channels could be constructed as those in the example of either of FIGS. 11A and 11B.

Yet another example of the transformation of one-dimensional signals utilizes the so-called "planar optics implementation", and provides a compact architecture based on the fact that the inversion of one of the signals is carried out in a separated optical path. According to this technique, the two optical paths defined by two setups may be placed one over the other, resulting in a much more compact package. The setups may be constructed as described above with reference to FIGS. 10A, 10B, 11A, 11B and 12.

Figure 13:
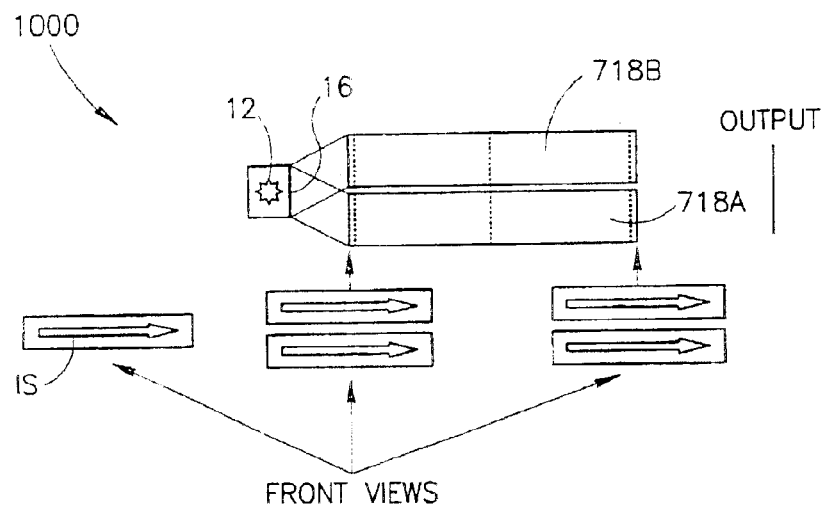
FIG. 13 illustrates one possible example of a system according to an embodiment of the invention utilizing planar optics, suitable for processing one-dimensional signals, wherein two optical paths are placed one over the other.

One possible planar optics implementation is schematically illustrated in FIG. 13, showing a system 1000, in which the one-dimensional input signal IS is placed horizontally (into the figure), and is replicated by suitable optics 16 along its narrow dimension (up or down) into two light components propagating along two paths. The two paths are treated separately in two one-dimensional planar packages (setups) 718A and 718B as described above. The optical elements (for the replication action and within the planar package) might be refractive or diffractive optical elements. FIG. 13 is similar in function to FIG. 10, however, the elements are flat rather than round.

Figure 14A:
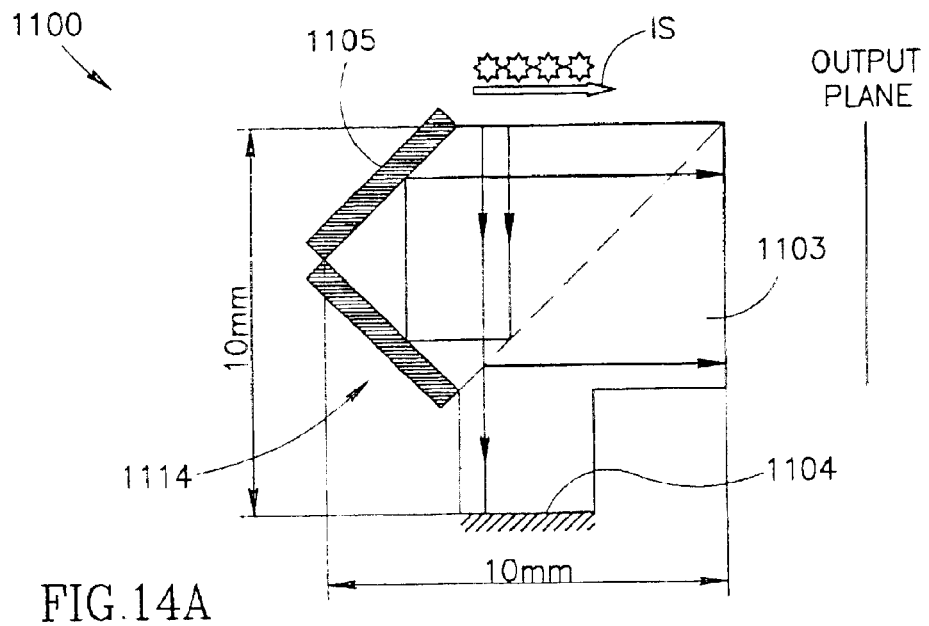
FIGS. 14A and 14B illustrate the top and side views, respectively, of a system according to another possible example of the planar optics based system suitable for processing one-dimensional signals, in accordance with an embodiment of the invention.
Figure 14B:
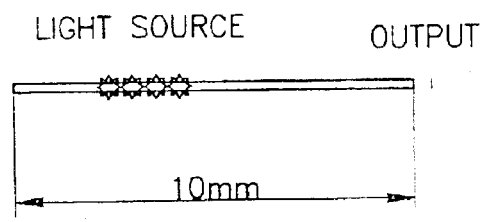

Another possible planar optics implementation for processing one-dimensional signals is illustrated in FIGS. 14A and 14B, showing, respectively, the top and side views of a system 1100. The system 1100 comprises a shearing interferometer constructed generally similar to that of FIG. 1A, namely, comprising a beam splitter 1103 and a mirror 1104, but utilizing an angular mirror 1105 instead of the Dove prism typically used. The interferometer is designed like a planar sheet 1114, whose thickness is very small, such that light may be guided along the narrow dimension of the sheet. Thus, the beam splitter 1103 is accommodated within the sheet, and the mirrors 1104 and 1105 are attached to some of the sheet edges. This embodiment is fictionally similar to that of FIG. 1A, except that it is flat.

If the sheet is of 10 mm×10 mm dimensions, the divergence of the light source is 15° in each direction, and the light source is of 5 mm size, then the total propagation length L should be at least:

$$\frac{5}{\sin(15)} \approx 20 \text{ mm}$$

This implementation distinguishes from the above-described examples in that the light, while propagating between the input and output planes, passes in two opposite directions, while in the previously described examples, light passes in one direction only from the input to the output plane.

Figure 15:
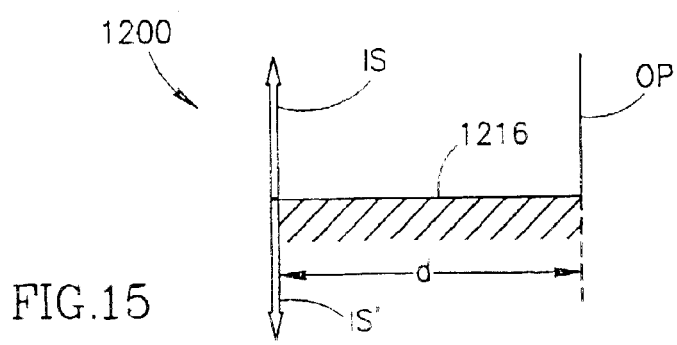
FIG. 15 illustrate a system according to an embodiment of the invention, suitable for performing one dimensional cosine transform, in which a mirror is used as a splitting sub-assembly.

Turning now to FIG. 15, there is illustrated a system 1200 capable of performing one-dimensional cosine transform, in which a mirror 1216 is used as the splitting sub-assembly. In some cases, this design will lead to a more compact system and sometimes to even a less complex optical configuration. As shown, the input signal IS (indicative of the image of an input object) is placed at a predetermined distance from the mirror 1216, which generates a virtual image IS'. The distance between any point on the input signal IS and the mirror 1216 determines the frequencies that will be obtained by the signal transform. Both images generate the shearing interference at the output plane OP. It should be noted that the overlapping area between the wavefronts from each couple of a point source (e.g., a light emitting element of the light source) and its image decreases as moving along the input signal IS away from the mirror. Therefore, the maximal distance determines the overlapping area in which the transform can be obtained.

In system 1200, where the split signals are obtained due to mirrors, the total length L is determined as follows:

$$L = d = \frac{4\Delta x}{\alpha} \quad (36)$$

For the data used before, L=426.7 mm and V=250 μm·Δx·L=1706 mm³. It is thus evident that such a system is half in its volume, as compared to the previously described examples. This can be understood by the fact that one of the images and paths is virtual.

When dealing with a two-dimensional input object, two variants of transformation are carried out. The first is a kernel one that includes spatial frequencies along one direction only. For example, a discrete Fourier transform of the input signal f(m,n) is $$\sum_{m,n=0}^{N-1} f(m, n) \exp\left(i\frac{\pi}{N}(mk + nl)\right) \quad (37)$$

This example may lead also to the following two-dimensional cosine transform:

$$F(k, 1) = \sum_{m,n=0}^{N-1} f(m, n) \cos\left(\frac{\pi}{N}(mk + nl)\right) \quad (38)$$

This transform can be achieved using the above-described examples, but with a two-dimensional input object replacing a one-dimensional object. The latter should contain a grid of point sources that are spatially incoherent, for example, by using a two-dimensional VCSEL array or LED array. The reason for this is associated with the fact that the impulse response of a system is still a cosine function with one-dimensional symmetry.

For some applications, a kernel that includes spatial frequencies along two orthogonal directions is required. For example, the two dimensional JPEG standard requires the following discrete Cosine transform kernel:

$$F(k, 1) = \sum_{m,n=0}^{N-1} f(m, n) \cos\left(\frac{\pi}{N}mk\right) \cos\left(\frac{\pi}{N}nl\right) \quad (39)$$

Figure 16:
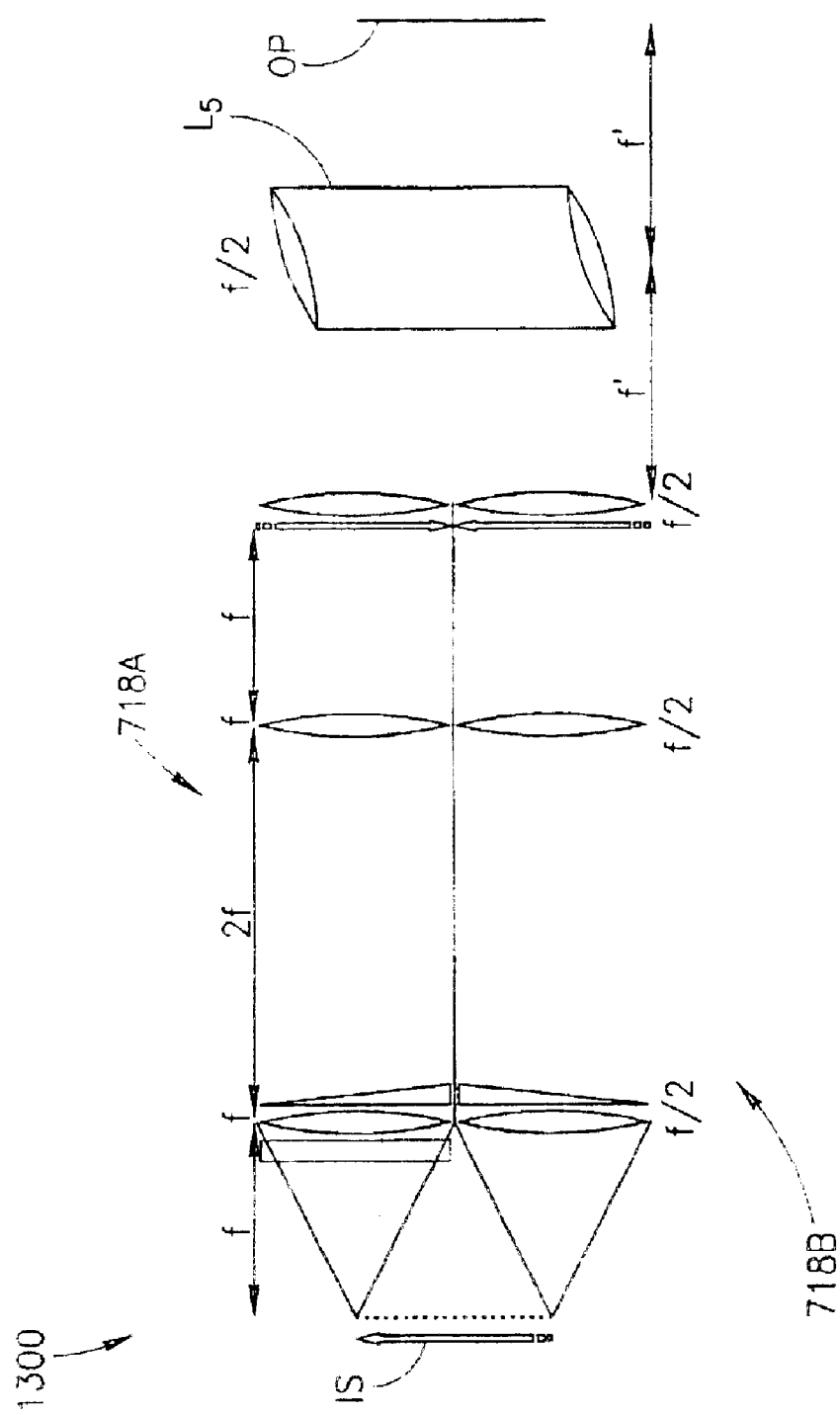
FIG. 16 illustrates an example of a system according to an embodiment of the invention for carrying out a two dimensional JPEG transform.

FIG. 16 illustrates a system 1300 for carrying out a two-dimensional JPEG transform by utilizing the same optical setup as above with two images. The system 1300 is capable of obtaining two images of the object in two successive cycles. To this end, this system is constructed generally similar to the example of FIG. 12, but also comprises anamorphic optics, for example, in the form of a cylindrical lens $L_5$, which provides imaging of an object along one axis only (with interference taking place along the other axis.

The cylindrical lens should be positioned such that its focal plane is located at the distance f/2 along the axis perpendicular to the plane of the figure. The focal plane is at the distance f/2, however, the image in this specific setup is obtained at a distance f from the lens, i.e., not at the focal plane.

Thus, in the direction along this axis, both setups 718A and 718B perform imaging. However, in the perpendicular plane (i.e., the plane of the figure), interference takes place. In other words, the interference pattern in the output plane is formed by interfering signals (images) indicative of only one dimension of the input signal. To provide interference of signals indicative of the two-dimensional input object along two mutually perpendicular axes, the system 1300 operates with two cycles: the object f(n,m) is first "interfered" along one axis in the output plane, thereby obtaining an intermediate interference pattern, $F_{int}(n,k)$, formed by the interference between the input signal along its one dimension with the image of the input signal along its second dimension. This intermediate pattern is then rotated at 90° (for example using a Dove prism with its hypotenuse plane tilted by −45°)

resulting in a signal $F^T_{int}(n,k)$, which is fed back into the system as an input signal.

Thus, in the first cycle, the system 1300 creates the intermediate interference pattern $F_{int}(n,k)$ indicative of the input object $f(n,m)$, described as follows:

$$F_{int}(n, k) = \sum_{m=0}^{N-1} f(m, n)\cos\left(\frac{\pi}{N}mk\right) \quad (40)$$

In the second cycle, the same optical system 1300 is fed by the rotated signal $F^T_{int}(n,k)$, that is:

$$F^T_{int}(n, k) = F_{int}(k, n) \quad (41)$$

The so-obtained output signal $F(k,1)$ is determined as follows:

$$F(k, 1) = \sum_{n=0}^{N-1} F_{int}(k, n)\cos\left(\frac{\pi}{N}nl\right) \quad (42)$$

Another possible way of performing a two-dimensional cosine transform is based on the use of a doubled sheared optical setup. This implementation requires a more complicated setup, aimed at generating an impulse response of:

$$\cos\left(\frac{\pi}{N}mk\right)\cos\left(\frac{\pi}{N}nl\right) \quad (43)$$

Figure 17:
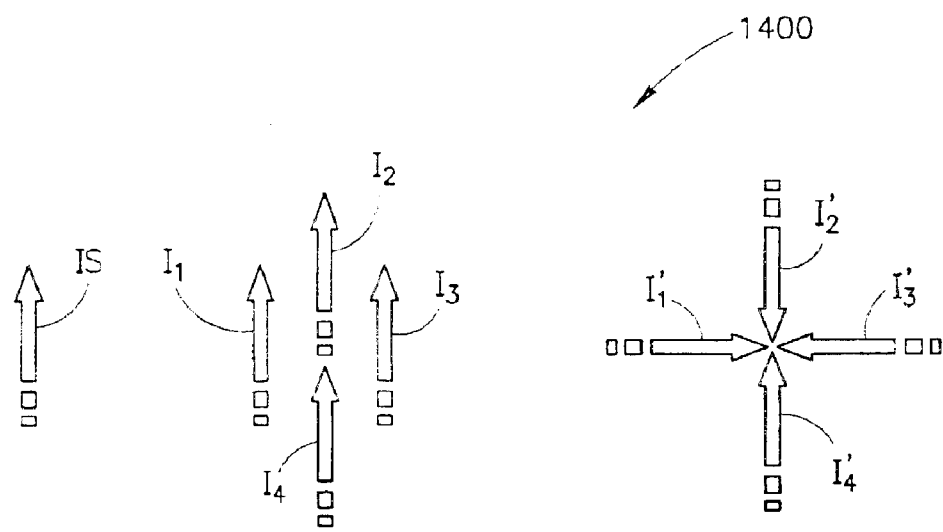
FIG. 17 schematically illustrates the operational principles of a system, according to an embodiment of the invention, for generating 2-D shearing interference.

FIG. 17 schematically illustrates the operational principles of such a doubled sheared optical setup based system denoted 1400. Each point of the input signal IS should be split four times. This may be achieved by the above described setup of FIG. 10A or FIG. 10B, but with two-dimensional diffraction grating and prisms. As shown in FIG. 17, four images $I_1$–$I_4$ are obtained after the light passage through the diffraction grating assembly, and are rotated by the lenses and prisms, thereby resulting in four output images $I'_1$–$I'_4$.

More specifically, the system 1400 starts with a self-illuminated image IS which is spatially incoherent. Then, a rectangular grid diffraction grating (not shown here) splits the image into four images. After the splitting, the propagation direction of the light components indicative of these images should be corrected. This can be done using four prisms (not shown) in a similar way used for the two-dimensional case as described above. After obtaining four identical images $I_1$–$I_4$ placed side by side, three of them are appropriately rotated: image $I_1$ by 180°, image $I_2$ by 90°, and image $I_3$ by −90°. The light components indicative of image $I_4$ propagate towards the output plane without any rotation.

An optical assembly used for rotating the images can be composed of four Dove prisms aligned at 90°, 45°, −45° and 0° angular orientations. Thus, the split images will be rotated (clockwise with respect to the vertical axis) in the following manner: the upper image $I_1$ will be rotated by 180° by a Dove prism with its hypotenuse plane titled 90°; the left image $I_2$ will rotated by 90° by a Dove prism with its hypotenuse plane titled by −45°; and the right image $I_3$ will be rotated by −90° degrees by a Dove prism with its hypotenuse plane titled by 45°.

Figure 18:
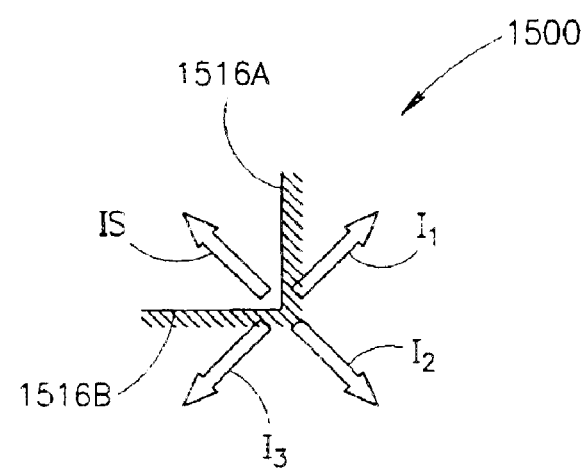
FIG. 18 illustrates another possible example of a system, according to an embodiment of the invention, carrying out the kernel transform.

FIG. 18 illustrates a system 1500 presenting yet another possible example for the implementation of the kernel transform with the impulse response (43) above. Here, two mirrors 1516A and 1516B constitutes the splitting sub-assembly, which provide three virtual images $I_1$, $I_2$ and $I_3$ of an input signal IS. The so obtained four signals IS, $I_1$, $I_2$ and $I_3$ generate interference patterns. For the 64 VCSELs input, $\Delta x=16$ mm. For the 512 VCSELs input, we have $\Delta x=64$ mm and V=6824 mm³.

In order to obtain the required kernel transform (expression (43) above), the following processing should be applied:

The following expressions can be derived from the shearing kernel:

$$\left[\cos\left(\frac{\pi \cdot k \cdot m}{N/2}\right)\cdot\cos\left(\frac{\pi \cdot n \cdot l}{N/2}\right)\cdot\right]^2 = \quad (44)$$
$$\frac{1}{4}\left[1 + \cos\left(\frac{\pi \cdot k \cdot m}{N}\right)\right]\cdot\left[1 + \cos\left(\frac{\pi \cdot n \cdot l}{N}\right)\right] = \frac{1}{4} + \frac{1}{4}\cos\left(\frac{\pi \cdot k \cdot m}{N}\right) +$$
$$\frac{1}{4}\cos\left(\frac{\pi \cdot l \cdot n}{N}\right) + \frac{1}{4}\cos\left(\frac{\pi \cdot k \cdot m}{N}\right)\cdot\cos\left(\frac{\pi \cdot l \cdot n}{N}\right)$$

$$F(k, 1) = DC + \sum_k\sum_m I(m, n)\cdot\cos\left(\frac{\pi \cdot k \cdot m}{N}\right)\cdot\cos\left(\frac{\pi \cdot l \cdot n}{N}\right) + \quad (45)$$
$$\sum_k\sum_m I(m, n)\cdot\cos\left(\frac{\pi \cdot k \cdot m}{N}\right) + \sum_k\sum_m I(m, n)\cdot\cos\left(\frac{\pi \cdot l \cdot n}{N}\right)$$

or $$F(k, l) = DC + \hat{\hat{I}}(k, l) + \hat{I}(k) + \hat{I}(l) \quad (46)$$

For the purposes of the present invention, the function $I(k,l)$, which is the required transform, can be found using equations (45) and (46). It should be noted that in the output plane along the line $(k,0)$ one obtains:

$$F(k) = DC_1 + 2\hat{I}(k) + DC_2 \quad (47).$$

$DC_1$ and $DC_2$ can be determined separately, and therefore $\hat{I}(k)$ can be extracted from the equation (47). In a similar way, $\hat{I}(k)$ can be obtained, and, finally, $$\hat{\hat{I}}(k, l)$$

can be determined using equation (46).

As indicated above, the optical length required for performing the shearing interferometer itself is governed by the divergence of the light source (ensuring that each point source illuminates the whole output region of interest), and by the matching condition. The above description is mainly associated with the continuous cosine transform and a sampled version thereof. The shearing interferometer can be used for realizing the DCT, and, under certain conditions presented below, any discrete linear transformation.

The following is a derivation for matching conditions for the shearing interferometers described above, for generating an arbitrary discrete transform. It should be understood that the systems described above can generate practically any transform between spatial intensity and spatial frequency domains, provided the proper matching condition is met.

The matching conditions comprise two portions, although both portions are generally determined and met in the same structure. One of these is spatial matching in which the sampling points on the detection side are chosen to match the detector elements used so that the output is a discrete transformation of the discrete input. Various geometric parameters must be satisfied, for example these may include the distance between the input and output planes. The second condition is the provision of "apertures" as defined below, which are directed to achieving/allowing a particular transform at the expense of others and to compensate for non-optimal sampling size. As used herein, apertures may include finite sized holes and/or a mask having an absorption varying with position. Such mask may be present at the input (source) or output (detector) side of the transformer or apertures may be present at both sides.

The following discussion provides a general methodology for providing such matching and specifics for application to apparatus containing shearing generators. Position matching is described first.

The output intensity distribution provided by the shearing interferometer is determined as follows:

$$F(x) = \int_0^\infty f(\bar{x})\cos\left(\frac{2\pi x \bar{x}}{\lambda D}\right)d\bar{x} + E_f \quad (48)$$

Here, $f(\bar{x})$ and $F(x)$ are the input and output intensity distributions respectively, $\lambda$ is the wavelength of the illuminating source, $D$ is connected with the geometry of the interferometer (for example, the distance between the first pixel of the input signal relative to the optical axis defined by the light propagation in the interferometer), and $E_f$ is the energy of the input signal.

The DCT to be realized is given by:

$$F(k) = \sum_{n=0}^{N-1} f(n)\cos\left[\frac{\pi k}{2N}(2n+1)\right] \quad (49)$$

wherein k is the discrete coordinate.

Assuming an ideal input pixels' shape (in the form of Dirac's delta functional) and an ideal sampling in the output plane, wherein N input pixels and N output pixels are located, respectively, at the following coordinates $n\Delta\bar{x}+\bar{x}_0$ and $k\Delta x$, and utilizing the above equation (48) connecting the input and output intensity distributions, the following result is obtained:

$$f(\bar{x}) = \sum_{n=0}^{N-1} f(n)\delta(\bar{x} - n\Delta\bar{x} - \bar{x}_0) \quad (50)$$

and $$F(k) = \int \sum_{n=0}^{N-1} f(n)\delta(\bar{x} - n\Delta\bar{x} - \bar{x}_0) \quad (51)$$
$$\cos\left[\frac{2\pi}{\lambda D}k\Delta x(n\Delta\bar{x} + \bar{x}_0)\right]d\bar{x} + E_f$$

The above equations (50) and (51) describe, respectively, the discrete input of the interferometer, and the analog output thereof.

Simplifying the above equation (51), we have:

$$F(k) = \sum_{n=0}^{N-1} f(n)\cos\left[\frac{2\pi\bar{x}_0\Delta x}{\lambda D}k\left(\frac{\Delta\bar{x}}{\bar{x}_0}n + 1\right)\right] + E_f \quad (52)$$

The comparison between the last equation (52) and the DCT (equation (49) above) provides the following reciprocity relations:

$$\Delta\bar{x} = 2\bar{x}_0 \quad (53)$$

$$\Delta x \Delta\bar{x} = \frac{\lambda D}{2N} \quad (54)$$

These relations indicate the exact connection between the locations of the various samples in the input and output planes. Hence, the output signal (52) obtained with the shearing interferometer is the DCT. Using the above analysis and optionally a simulation, one can determine the largest pinhole size that will yield a required accuracy.

It is often the case that the pixels of input and output devices cannot be approximated as lo delta functions. This is especially true of detector elements, since making them too small will result in unacceptable power loss. In this case, the pixels' response and the output sampling process should be specifically considered. The following is a relatively general analysis of this situation.

Assuming that the response of each of the input pixels can be modeled by an arbitrary function l(x) (which can be determined, for example, by imaging a turned-on pixel along the input source), the input may be presented as $$f(\bar{x}) = l(\bar{x}) \otimes \sum_{n=0}^{N-1} f(n)\delta(\bar{x} - n\Delta\bar{x} - \bar{x}_0) \quad (55)$$

wherein $\otimes$ corresponds to the convolution operation.

Assuming that $f(x<0)=0$, the output intensity distribution is as follows:

$$F(x) = \frac{1}{2}\int_{-\infty}^{\infty} f(\bar{x})\exp\left(\frac{i2\pi x\bar{x}}{\lambda D}\right)d\bar{x} + \quad (56)$$
$$\frac{1}{2}\int_{-\infty}^{\infty} f(\bar{x})\exp\left(-\frac{i2\pi x\bar{x}}{\lambda D}\right)d\bar{x} + E_f$$

For the sake of simplicity, $E_f$ will be ignored temporarily. It is considered below. The above equation (56) can thus be rewritten as:

$$F(x) = \frac{1}{2}\tilde{f}\left(-\frac{x}{\lambda D}\right) + \frac{1}{2}\tilde{f}\left(\frac{x}{\lambda D}\right) \quad (57)$$
$$= \frac{1}{2}L\left(-\frac{x}{\lambda D}\right)\sum_{n=0}^{N-1} f(n)\exp\left[i\frac{2\pi\Delta\bar{x}}{\lambda D}\left(n+\frac{1}{2}\right)x\right] +$$
$$\frac{1}{2}L\left(\frac{x}{\lambda D}\right)\sum_{n=0}^{N-1} f(n)\exp\left[-i\frac{2\pi\Delta\bar{x}}{\lambda D}\left(n+\frac{1}{2}\right)x\right]$$

wherein L and $\tilde{f}$ are the Fourier transforms of l and f, respectively.

Assuming that the input pixels response l (and therefore L) is a symmetric function, for the output intensity distribution F(x) we obtain:

$$F(x) = L\left(\frac{x}{\lambda D}\right)\sum_{n=0}^{N-1} f(n)\cos\left[\frac{2\pi\Delta\bar{x}}{\lambda D}\left(n+\frac{1}{2}\right)x\right] \quad (58)$$

Considering now a non-ideal sampling process in the output plane, we have:

$$F(k) = \frac{1}{\Delta x}\int_{k\Delta x - \frac{\Delta x}{2}}^{k\Delta x + \frac{\Delta x}{2}} F(x)W_k(x)dx \quad (59)$$

wherein $W_k(x)$ is the weighting function of the $k^{th}$ output pixel.

Introducing the following definition:

$$R(x;k) = L\left(\frac{x}{\lambda D}\right)W_k(x) \quad (60)$$

we obtain:

$$F(k) = \frac{1}{\Delta x}\sum_{n=0}^{N-1} f(n)\int_{k\Delta x - \frac{\Delta x}{2}}^{k\Delta x + \frac{\Delta x}{2}} R(x;k)\cos\left[\frac{\pi\Delta\bar{x}}{\lambda D}(2n+1)x\right]dx \quad (61)$$

Comparing the latter result to the DCT (equation (52) above), we obtain a set of N*N equations in the form:

$$\cos\left[\frac{\pi k}{2N}(2n+1)\right] = \frac{1}{\Delta x}\int_{k\Delta x - \frac{\Delta x}{2}}^{k\Delta x + \frac{\Delta x}{2}} R(x;k)\cos\left[\frac{\pi\Delta\bar{x}}{\lambda D}(2n+1)x\right]dx \quad (62)$$

Considering a different reciprocity relation (as compared to the above equations (53) and (54)), that is:

$$\frac{\Delta x \Delta \bar{x}}{\lambda D} = 1 \quad (63)$$

we obtain R(x;k) in the form:

$$R(x;k) = 2\sum_{n=0}^{N-1}\cos\left[\frac{\pi k}{2N}(2n+1)\right]\cos\left[\frac{\pi}{\Delta x}(2n+1)x\right] \quad (64)$$

It should be noted that the use of the above technique can facilitate the realization of an arbitrary discrete linear transformation of the form:

$$F(k) = \sum_{n=0}^{N-1} f(n)C(k,n) \quad (65)$$

In this case, R(x;k) becomes:

$$R(x;k) = 2\sum_{n=0}^{N-1} C(k,n)\cos\left[\frac{\pi}{\Delta x}(2n+1)x\right] \quad (66)$$

The solution for R(x;k) is indicative of the matching condition to be satisfied by the relation between the input and output pixels (i.e., the centers of these pixels). It should be noted that $E_p$, which was omitted in the previous considerations, will appear in the output plane, and will result in a different value for each one of the output pixels. However, its contribution can be calculated in advance and may be compensated.

In some cases a vector to be processed by a shearing processor, in accordance with an embodiment of the present invention, may have a number of components that is larger than the number of light sources in an array of light sources used to represent vectors in the shearing processor. The vector cannot therefore be completely represented by the light source array and the shearing processor cannot produce a processed result for the vector in a single step. In such cases, in accordance with an embodiment of the present invention, the vector may be partitioned into a plurality of shorter "partial" vectors each having a number of components that is equal to or less than the number of light sources in the light source array. Each of the partial vectors is then processed by the shearing processor. Results from the processing of all the partial vectors are then combined to provide a processed result for the vector. Partitioning "overlong" vectors to be processed by a shearing processor, in accordance with an embodiment of the present invention is discussed in PCT application entitled "OFDM Apparatus and Method" filed on even date with the present application in the Israel Patent Office. This application is hereby incorporated herein by reference.

In addition, PCT application PCT/IL99/00479, filed Sep. 5, 1999 and published as WO 00/72267 describes various DCT configurations. This application is incorporated herein by reference. Combinations of some of these configurations, with a shearing generator may be useful in the practice of the present invention.

Those skilled in the art will readily appreciate that various modifications and changes can be applied to the embodiments of the invention as hereinbefore described, without departing from its scope defined in and by the appended claims. For example, any suitable configuration of a shearing interferometer may be used for carrying out the discrete cosine or discrete sine transform, provided a matching condition is appropriately considered. The shearing interferometer configurations according to the invention, however, provide more simple and compact designs, as compared to the known configuration, utilizing the combination of a beam splitter, a mirror and a dove prism, and provides for simultaneously obtaining both cosine and sine discrete transforms of an input signal.

Furthermore, while a large number of examples have been disclosed, each having numerous elements, some embodiments of the invention do not require all of the elements shown and some embodiments of the invention utilize elements shown in different of the disclosed embodiments.

As used in the claims, the terms "comprise", "include", and "have" and their conjugates mean "including, but not necessarily limited to".

What is claimed is:

1. Optical apparatus for obtaining a discrete transform of an input signal in an output plane, the system comprising:
   a light source that represents the signal positioned at an input surface and comprising a two dimensional rectangular array of N light emitting elements arranged in an m×n matrix, wherein N=m*n, and the m and n elements are aligned along X and Y-axes with pitches a and b respectively, and the matrix is tilted by an angle β so that a+cos β=n*b*sin β;
   a detector positioned at an output surface, the detector comprising an array of N spaced detectors, spaced with a second spacing, such that it samples light at the output surface; and
   an optical transformer that collects light from the light source and transforms it into a pattern at the output surface, said optical transformer being constructed such, such that the sampling of the output signal results in the discrete transform of the input signal,
   wherein said optical transformer includes a shearing generator that provides two images of the light source that are inverted forms of each other, interference between said images providing a continuous interference pattern that is sampled by said detector.

2. Optical apparatus according to claim 1 wherein the shearing generator introduces a phase difference between corresponding points on said two images such that the transform is a sine transform.

3. Optical apparatus according to claim 1 wherein the shearing processor provides a phase difference between corresponding points on said two images such that the transform is a cosine transform.

4. Apparatus according to claim 1 wherein said optical apparatus provides both sine and cosine transforms or at least one combination of sine and cosine transforms.

5. Apparatus according to claim 1 wherein said transform is a two dimensional transform.

6. Apparatus according to claim 5, wherein the optical assembly comprises anamorphic optics accommodated in the optical path of the two interfering signals, the system thereby providing for obtaining a two-dimensional transform of a two-dimensional input signal.

7. Apparatus according to claim 1, wherein the light source includes a highly coherent or partially coherent light emitting element, and a spatial coherence removing element.

8. Apparatus according to claim 1, wherein the light source includes an array of temporally coherent, but mutually spatially incoherent light emitting elements.

9. Apparatus according to claim 8, wherein said light source includes vertical cavity surface emitting lasers (VCSEL).

10. Apparatus according to claim 1, wherein the shearing generator comprises a splitting sub-assembly that splits light from the input source into at least one pair of interfering light waves, and defines different optical paths for the light propagation of the light waves.

11. Apparatus according to claim 10, wherein said splitting sub-assembly comprises a diffractive optical element.

12. Apparatus according to claim 10, wherein said splitting sub-assembly comprises a beam splitter.

13. Apparatus according to claim 12 wherein the beam splitter is a cubic beam splitter.

14. Apparatus according to claim 10 wherein the splitting sub-assembly comprises a mirror.

15. Apparatus according to claim 12, including a phase shifting element formed by a coating on an inner diagonal surface of the beam splitter so as to provide a desired phase shift between the different parts of the input signal transmitted through and reflected from two parts of said surface at two opposite sides of a bisection line of the beam splitter, respectively.

16. Apparatus according to claim 10, wherein said splitting sub-assembly comprises a grating assembly splitting the input signal, the optical assembly further comprising a rotating sub-assembly in the optical path of the splitting sub-assembly for creating the two pairs of interfering signals.

17. Apparatus according to claim 9 wherein the optical assembly comprises a phase shifting element in one of the two optical paths, so as to provide a $\pi/2$ phase difference in the length of optical paths for the two images, thereby providing a sine transform of the input signal in the output plane.

18. Apparatus according to claim 17 wherein the phase shifting element comprises a coating on a reflecting or refractive surface of the splitting sub-assembly.

19. Apparatus according to claim 1, wherein said optical assembly comprises at least one pair of separate setups for creating said at least one pair of interfering images in the form of, respectively, an inverted image and non-inverted image of the input signal.

20. Apparatus according to claim 19, wherein the optical assembly has a planar structure, two optical paths defined by the two separate setups being placed beside each other.

* * * * *